(12) United States Patent
Sim et al.

(10) Patent No.: US 9,501,099 B2
(45) Date of Patent: Nov. 22, 2016

(54) ELECTRONIC DEVICE

(71) Applicant: Creative Technology Ltd, Singapore (SG)

(72) Inventors: Wong Hoo Sim, Singapore (SG); Teck Chee Lee, Singapore (SG); Thean Kuie Christopher Chang, Singapore (SG)

(73) Assignee: Creative Technology Ltd, Singapore (SG)

( * ) Notice: Subject to any disclaimer, the term of this patent is extended or adjusted under 35 U.S.C. 154(b) by 167 days.

(21) Appl. No.: 13/656,605

(22) Filed: Oct. 19, 2012

(65) Prior Publication Data

US 2014/0084014 A1 Mar. 27, 2014

(30) Foreign Application Priority Data

Sep. 27, 2012 (SG) ................. 201207216-1

(51) Int. Cl.
*G06F 1/16* (2006.01)

(52) U.S. Cl.
CPC ........... *G06F 1/1626* (2013.01); *G06F 1/1688* (2013.01)

(58) Field of Classification Search
CPC ................. G06F 1/16; G06F 1/1626

USPC ......................................... 361/730; 220/669
See application file for complete search history.

(56) References Cited

U.S. PATENT DOCUMENTS

| 6,522,763 | B2* | 2/2003 | Burleson | G06F 1/1616 |
| | | | | 361/679.23 |
| 8,006,105 | B1* | 8/2011 | Sivertsen | 713/300 |
| 2002/0081893 | A1* | 6/2002 | Koh | 439/491 |
| 2006/0103633 | A1* | 5/2006 | Gioeli | 345/173 |
| 2006/0117623 | A1* | 6/2006 | Watanabe | F16M 11/00 |
| | | | | 40/606.15 |
| 2007/0026909 | A1* | 2/2007 | Jung et al. | 455/575.3 |
| 2007/0087596 | A1* | 4/2007 | Chung et al. | 439/131 |
| 2007/0247800 | A1* | 10/2007 | Smith et al. | 361/683 |
| 2008/0220812 | A1* | 9/2008 | Wang | H04M 1/03 |
| | | | | 455/550.1 |
| 2009/0167508 | A1* | 7/2009 | Fadell | G06F 3/016 |
| | | | | 340/407.2 |

* cited by examiner

*Primary Examiner* — Dion R Ferguson
*Assistant Examiner* — Mandeep S Buttar
(74) *Attorney, Agent, or Firm* — Russell Swerdon; Desmund Gean

(57) ABSTRACT

An electronic device is provided. The electronic device can include one or more protrusions and a casing. The casing can be shaped and dimensioned to carry the audio output portions. The casing can include a first face, a second face and sides. The one or more protrusions can extend from any of, or any combination of, the first face, the second face and at least one of the sides.

10 Claims, 16 Drawing Sheets

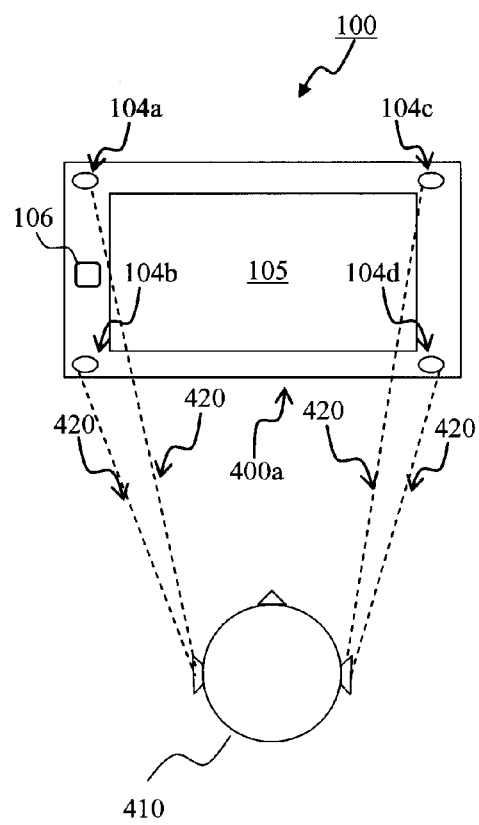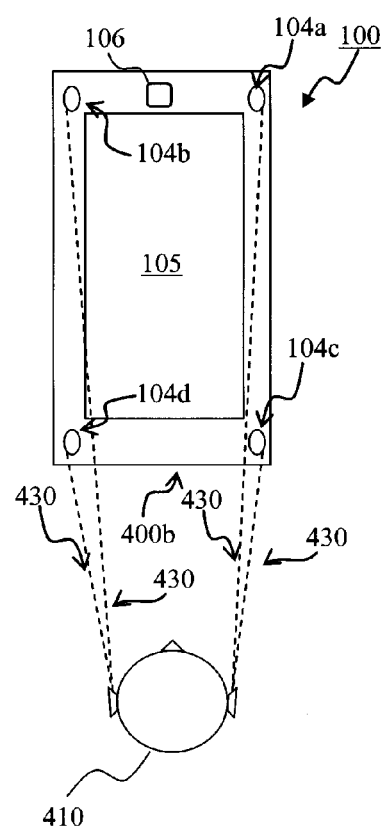
Fig. 4a
Fig. 4b

ELECTRONIC DEVICE

FIELD OF INVENTION

The present disclosure generally relates an electronic device which can accommodate speaker drivers with large dimensions without having to substantially increase the electronic device real estate.

BACKGROUND

Portable electronic devices such as electronic tablet devices are becoming more and more popular. An electronic tablet device can be used for entertainment purposes such as video and/or audio playback. In this regard, an electronic tablet device can be regarded as an electronic audio reproduction device having speaker drivers for output of audio signals during audio playback.

When a conventional electronic audio reproduction device performs audio payback, power rating of the speaker drivers can be material.

Particularly, speaker drivers with high power ratings can be capable of more powerful audio playback compared to speaker drivers low power ratings. Conversely, audio playback using speaker drivers with low power ratings can be less powerful compared to speaker drivers with high power ratings.

Thus if more powerful audio playback is desired, it may be necessary for the electronic audio reproduction device to have speaker drivers with high power ratings.

Speaker drivers with high power ratings may have larger physical dimensions compared to speaker drivers with low power ratings.

Conventional techniques to accommodate speaker drivers with high power ratings include increasing real estate of the electronic audio reproduction device.

Increasing real estate of the electronic reproduction device can be a simple solution to facilitate the electronic audio reproduction device in accommodating speaker drivers with high power ratings. However increasing the electronic audio reproduction device real estate may render the electronic audio reproduction device bulky and/or aesthetically unpleasing.

It is therefore desirable to provide a solution to address at least one of the foregoing problems of conventional techniques to accommodate speaker drivers with high power ratings.

SUMMARY OF THE INVENTION

In accordance with an aspect of the disclosure, an electronic device is provided. The electronic device can include one or more audio output portions, one or more protrusions and a casing.

The casing can be shaped and dimensioned to carry the one or more audio output portions. The casing can include a first face, a second face and sides.

The first and second faces can be spaced apart in a manner such that the sides can be defined between the first and second faces. Additionally, the one or more protrusions can extend from any of, or any combination of, the first face, the second face and at least one of the sides.

In one embodiment, the casing can be shaped and dimensioned in a manner so as to form the one or more protrusions. The one or more protrusions can be capable of carrying the one or more audio output portions.

In an exemplary event where there are a plurality of protrusions and a plurality of audio output portions, the number of protrusions can correspond to the number of audio output portions. Each protrusion can carry a corresponding at least a portion of an audio output portion.

In another embodiment, the one or more protrusions can correspond to at least a portion of the one or more audio output portions protruding from any of, or any combination of, the first face, the second face and at least one of the sides of the casing.

In an exemplary event where there are a plurality of protrusions and a plurality of audio output portions, the number of protrusions can correspond to the number of audio output portions. Each protrusion can correspond to at least a portion of an audio output portion protruding from any of, or any combination of, the first face, the second face and at least one of the sides of the casing.

BRIEF DESCRIPTION OF THE DRAWINGS

Embodiments of the disclosure are described hereinafter with reference to the following drawings, in which:

FIG. 4a shows that the electronic device can be positioned in a first orientation relative to a user, according to an embodiment of the disclosure;

FIG. 4b shows that the electronic device can be positioned in a second orientation relative to a user, according to an embodiment of the disclosure.

DETAILED DESCRIPTION

Representative embodiments of the disclosure, for addressing one or more of the foregoing problems associated with conventional techniques to accommodate speaker drivers with high power ratings, are described hereinafter with reference to FIG. 1 to FIG. 5.

Figure 1A:
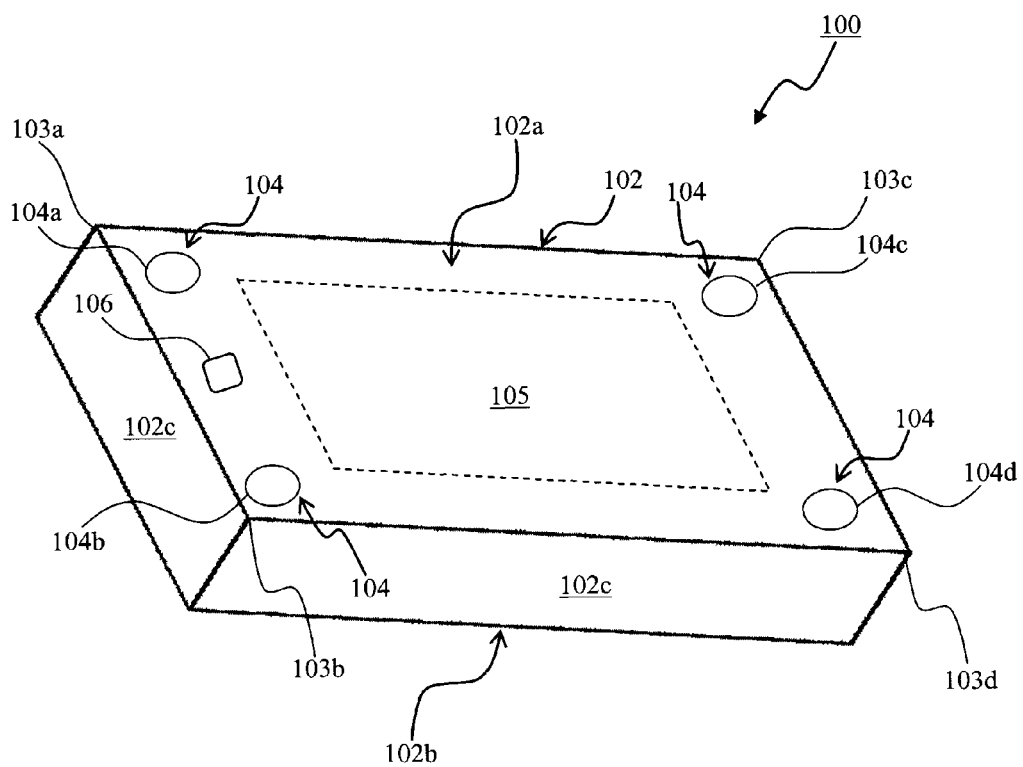
FIG. 1a shows an electronic device which can include a first speaker driver, a second speaker driver, a third speaker driver and a fourth speaker driver, according to an embodiment of the disclosure.
Figure 1B:
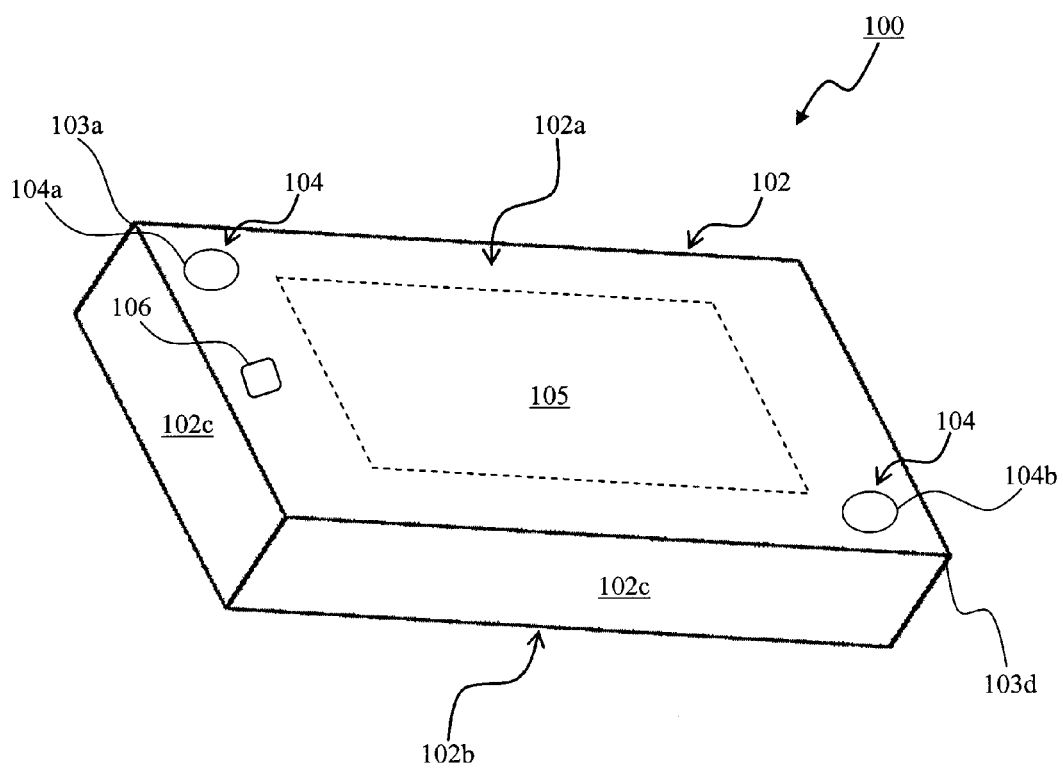
FIG. 1b shows an electronic device which can include a first speaker driver and a second speaker driver, according to an embodiment of the disclosure.
Figure 1C:
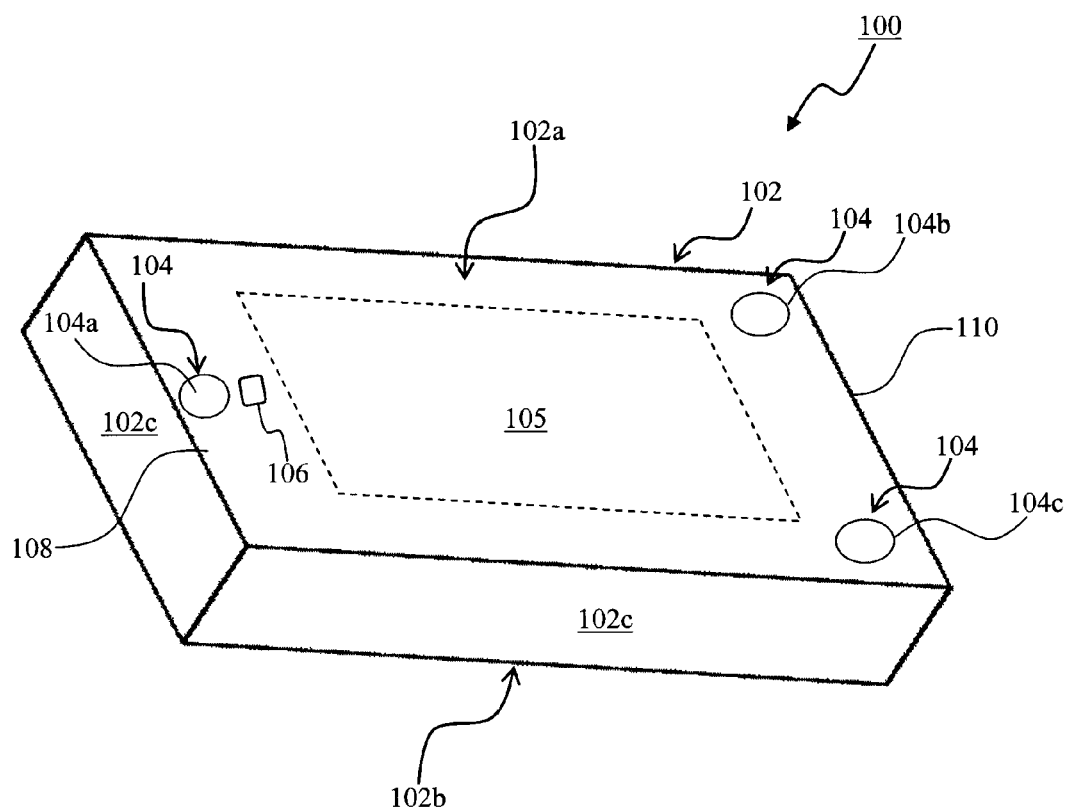
FIG. 1c shows an electronic device which can include a first speaker driver, a second speaker driver and a third speaker driver, according to an embodiment of the disclosure.

Referring to FIG. 1a to FIG. 1c, an electronic device 100 is shown in accordance with an embodiment of the disclosure. The electronic device 100 can, for example, be an electronic tablet device.

The electronic device 100 can include a casing 102. The casing 102 can include a first face 102a, a second face 102b and sides 102c. The first face 102a and the second face 102b are opposite each other and are spaced apart such that sides 102c are defined between the first and second faces 102a/102b. Additionally, the casing 102 can include a first corner 103a, a second corner 103b, a third corner 103c and a fourth corner 103d.

The electronic device 100 can include one or more audio output portions 104. Preferably, the electronic device 100 includes a plurality of audio output portions 104. The electronic device 100 can, optionally, further include one or both of a display module 105 and an image capture module 106. The electronic device 100 can, optionally, yet further include one or more photonic based detectors/sensors (not shown).

The casing 102 can be shaped and dimensioned to carry the audio output portions 104. The casing 102 can be further shaped and dimensioned to carry the display module 105. The casing 102 can yet be further shaped and dimensioned to carry the image capture module 106 and/or one or more photonic based detectors/sensors.

The audio output portions 104 can be carried at one or both of the first face 102a and the second face 102b. For example, as shown in FIG. 1a, the audio output portions 104 can be carried at the first face 102a of the casing and can be arranged along the edges of the first face 102a. The audio output portions 104 can, for example, be speaker drivers configured to output audio signals.

Additionally, the display module 105, the image capture module 106 and the one or more photonic based detectors/sensors can be carried at the first face 102a of the casing 102. The display module 105 can be positioned at substantially the center of the first face 102a and the image capture module 106 can be arranged along an edge of the first face 102a. The photonic based detectors/sensors can be arranged along an edge of the first face 102a.

The display module 105 can, for example, be a touch sensitive screen such a liquid crystal display (LCD) screen. The image capture module 106 can, for example, be a webcam or a camera sensor with fisheye type lens. The aforementioned one or more photonic based detectors/sensors can, for example, be one or more infrared (IR) sensors. The display module 105, the image capture module 106 and the photonic based detectors/sensors will be discussed later in further detail with reference to FIG. 3.

Earlier mentioned, the audio output portions 104 can be carried at the first face 102a of the casing and can be arranged along the edges of the first face 102a. Further earlier mentioned, the audio output portions 104 can, for example, be speaker drivers.

In one embodiment, as shown in FIG. 1a, the audio output portions 104 can include a first speaker driver 104a, a second speaker driver 104b, a third speaker driver 104c and a fourth speaker driver 104d. The speaker drivers 104a/104b/104c/104d can be positioned along the edges of the first face 102a such that a speaker driver is located adjacent or at a corner of the first face 102a. For example, the first speaker driver 104a can be located adjacent/at the first corner 103a, the second speaker driver 104b can be located adjacent/at the second corner 103b, the third speaker driver 104c can be located adjacent/at the third corner 103c and the fourth speaker driver 104d can be located adjacent/at the fourth corner 103d.

In another embodiment, as shown in FIG. 1b, the audio output portions 104 can include a first speaker driver 104a and a second speaker driver 104b.

Preferably (as shown in FIG. 1b), the speaker drivers 104a/104b can be positioned along the edges of the first face 102a such that they are located adjacent or at diagonal corners of the casing 102. For example, the first speaker driver 104a can be positioned adjacent/at the first corner 103a and second speaker driver 104b can be positioned adjacent/at the fourth corner 103d which is diagonal to the first corner 103a.

Alternatively (not shown in FIG. 1b), the first and second speaker drivers 104a/104b can be positioned along the edges of the first face 102a such that they are located along opposing edges of the first face 102a. For example, the first speaker 104a can be positioned in the middle along a first edge of the first face 102a and the second speaker 104b can be positioned in the middle along a second edge of the first face 102a. The first edge is opposite the second edge.

In yet another embodiment, as shown in FIG. 1c, the audio output portions 104 can include a first speaker driver 104a, a second speaker driver 104b and a third speaker driver 104c. The first speaker driver 104a can be arranged along a first edge 108 of the first face 102a. The second and third speaker drivers 104b/104c can be arranged along a second edge 110 of the first face 102a. The first edge 108 is opposite the second edge 110. For example, the first speaker driver 104a can be positioned in the middle along the first edge 108, the second speaker driver 104b can be positioned at one end of the second edge 110 and the third speaker driver 104c can be positioned at another end of the second edge 110.

In general, as discussed with reference to FIG. 1a to FIG. 1c, it is preferable that the audio output portions 104 are arranged along the edges of the first face 102a in a manner such that for one or more audio output portions 104 arranged along one edge of the first face 102a, one or more other audio output portions 104 are arranged along an opposite edge of the first face 102a.

Referring to FIGS. 2a to 2h, the electronic device 100 can, in accordance with another embodiment of the disclosure, include one or more protrusions 200. Preferably, the electronic device 100 includes a plurality of protrusions 200.

For the sake of clarity, FIG. 2a to FIG. 2h will be discussed with reference to a plurality of protrusions 200. It is appreciable that the following discussion can similarly apply to a scenario where the electronic device 100 includes one protrusion 200.

Figure 2A:
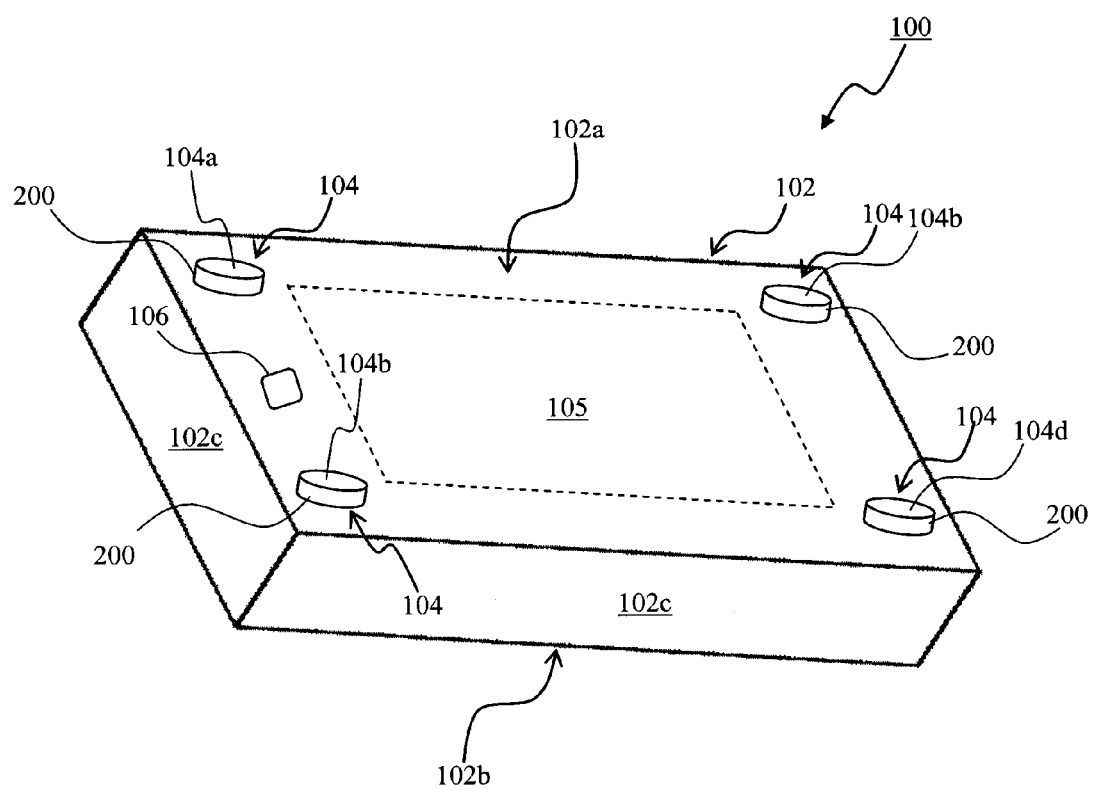
FIG. 2a to FIG. 2h show that the electronic device of FIG. 1a can include a plurality of protrusions, according to an embodiment of the disclosure.
Figure 2B:
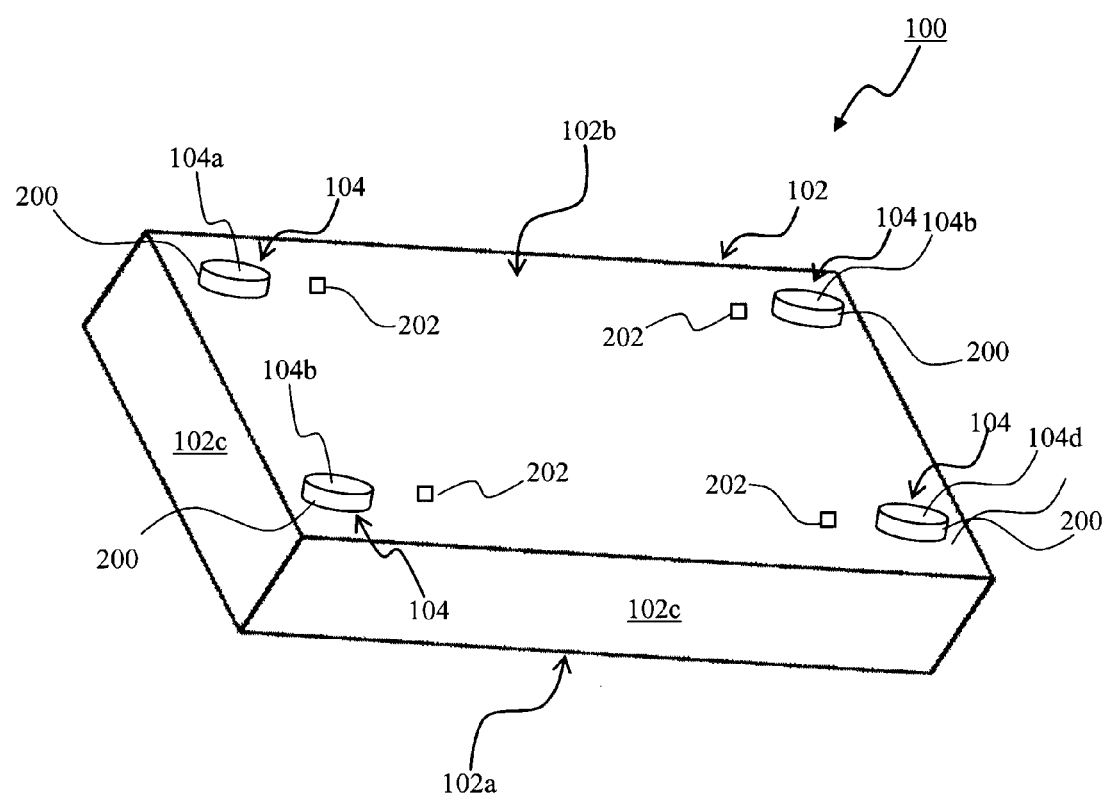
Figure 2C:
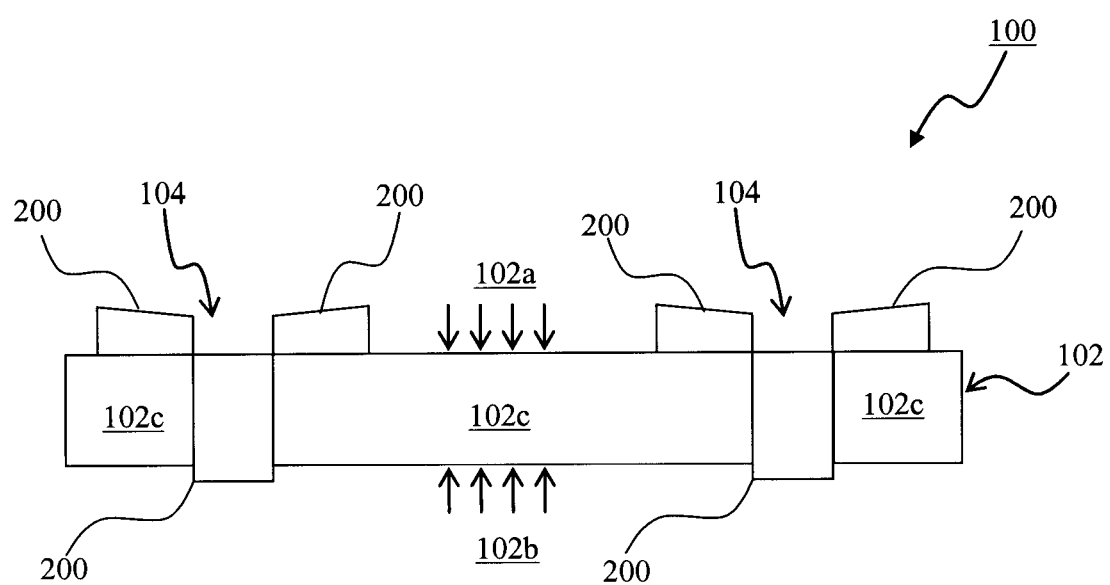

FIG. 2a to FIG. 2c show a first exemplary arrangement where the protrusions 200 can be extending/protruding from one or both of the first face 102a and the second face 102b of the casing 102. FIG. 2d to FIG. 2h show a second exemplary arrangement where the protrusions 200 can be extending/protruding from at least one of the sides 102c of the casing 102. Preferably, the protrusions 200 extend/protrude from the sides 102c of the casing 102.

Figure 2D:
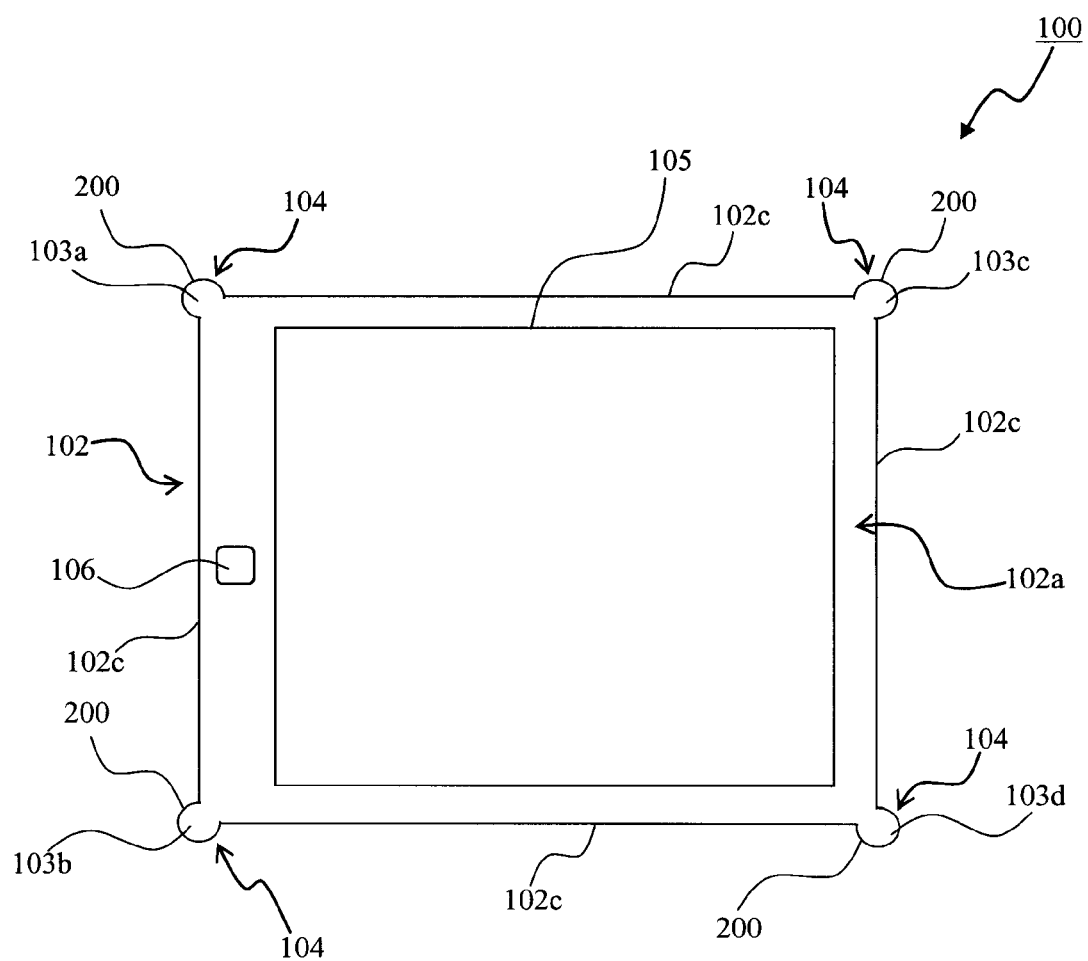
Figure 2E:
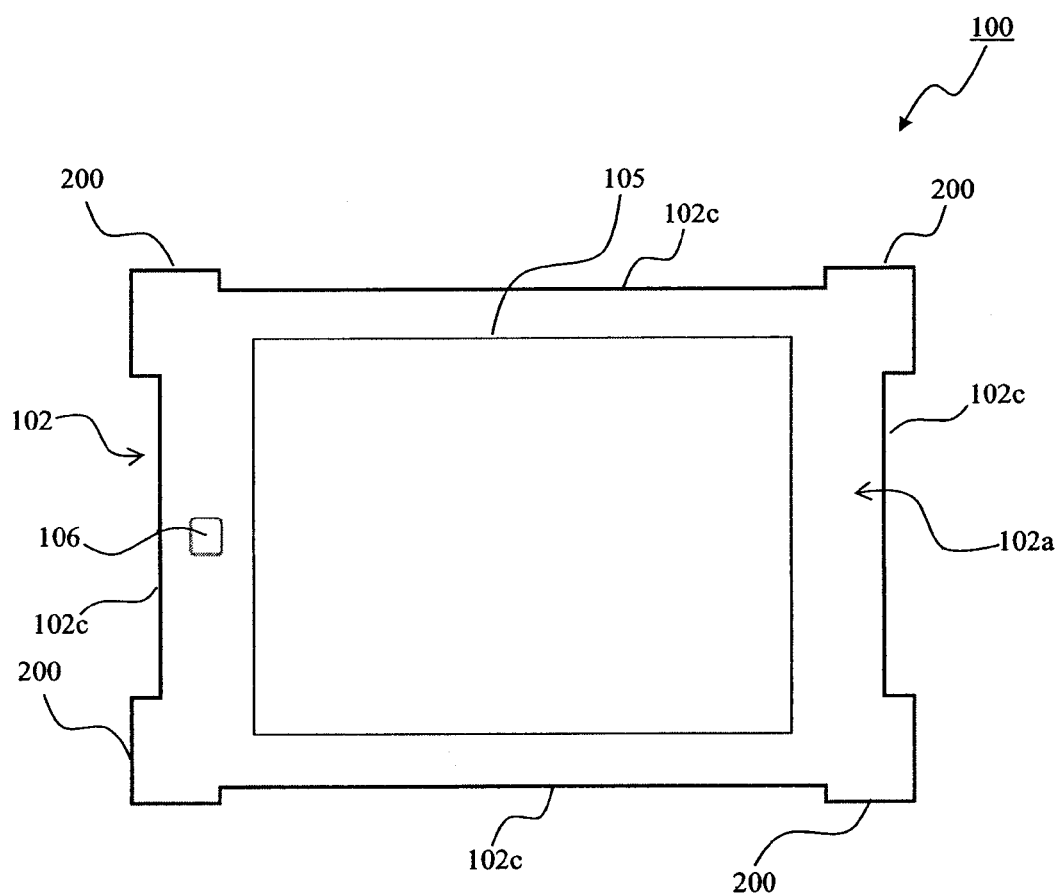
Figure 2F:
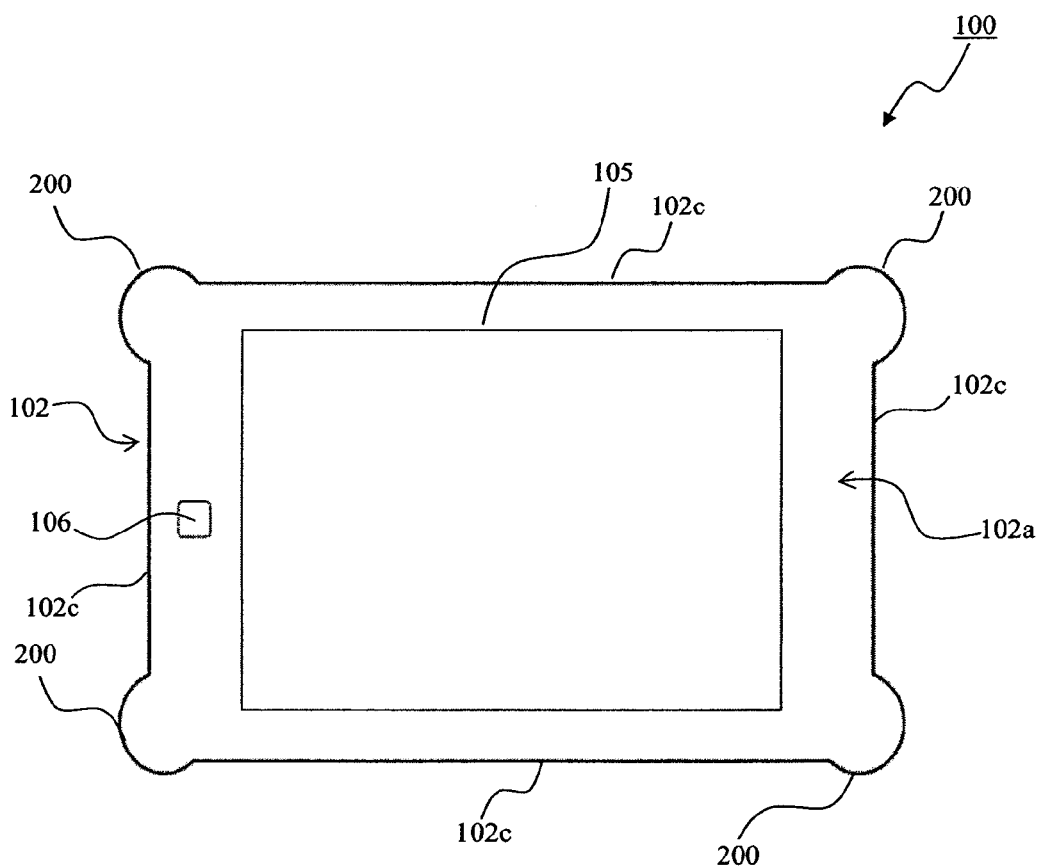
Figure 2G:
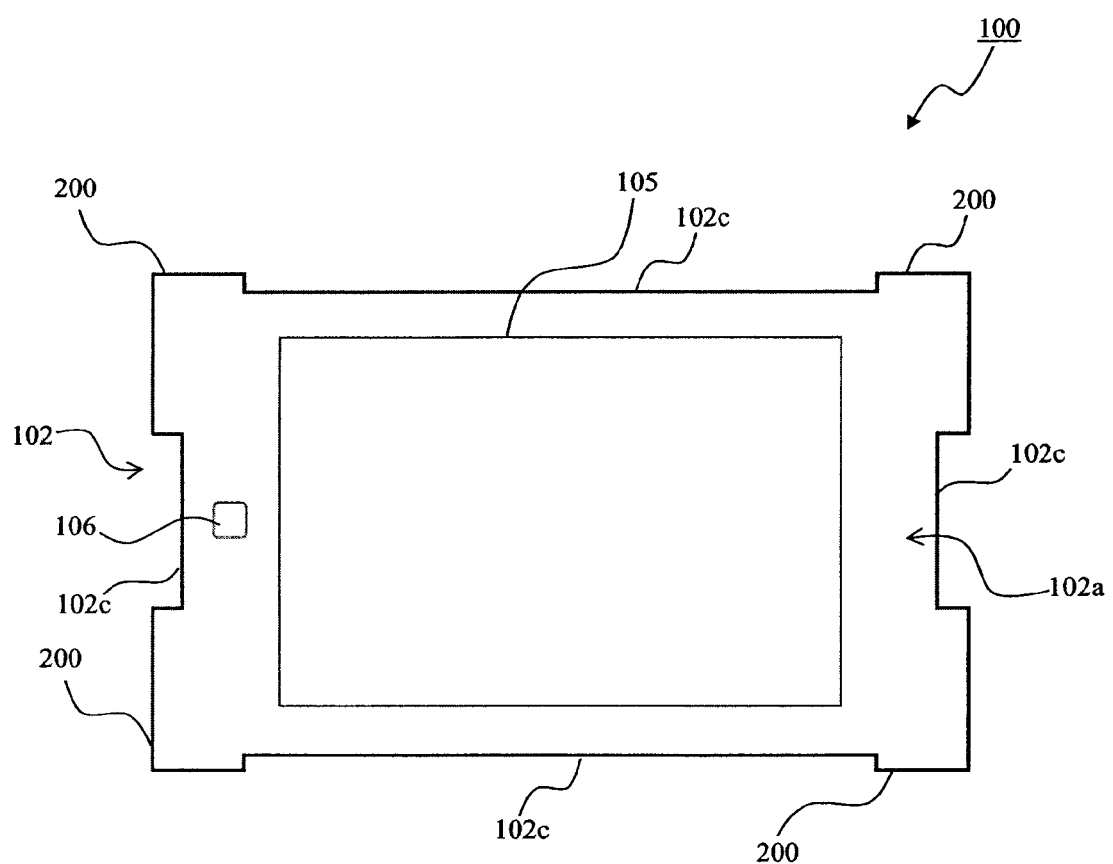
Figure 2H:
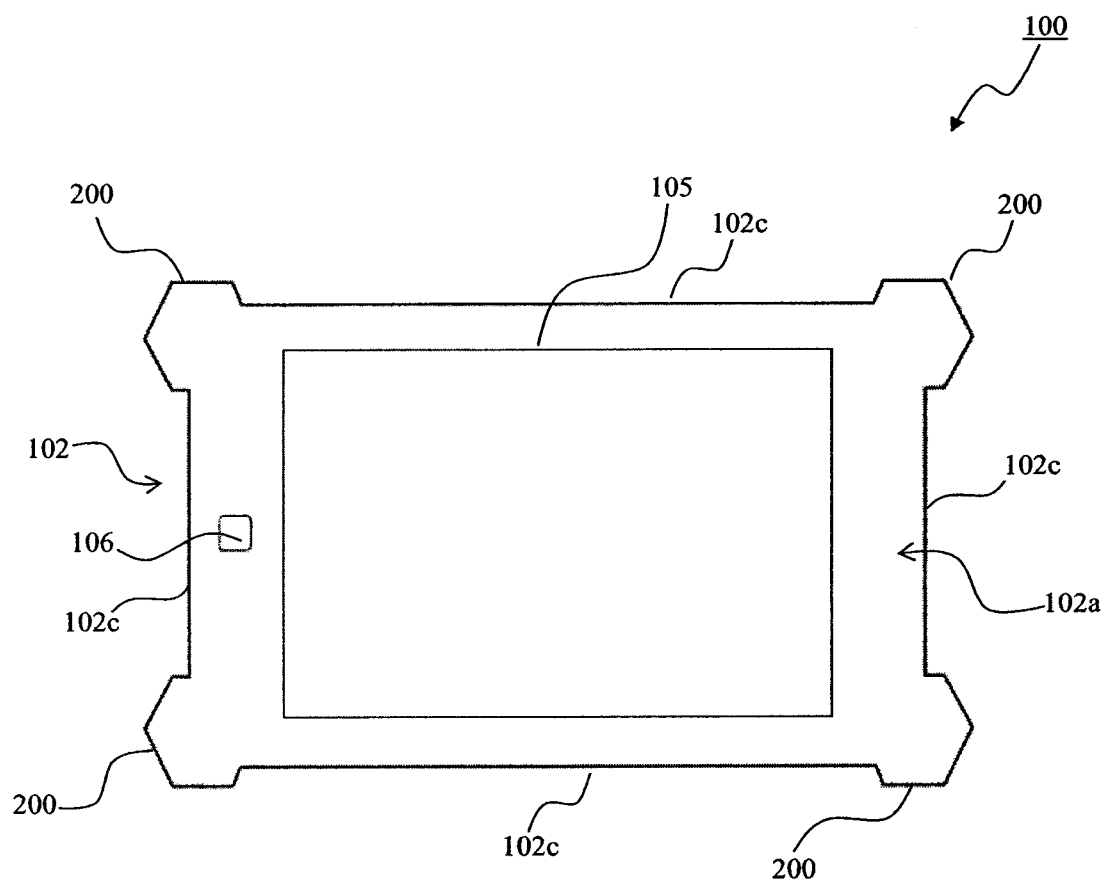

In particular, FIG. 2a shows a first perspective view with reference to the first face 102a of the casing 102. FIG. 2b shows a second perspective view with reference to the second face 102b of the casing 102. FIG. 2c shows a side view with reference to one of the sides 102c of the casing 102. FIG. 2d shows, in one example, the protrusions 200 can extend from any of, or any combination of, the first to fourth corners 103a/103b/103c/103d of the casing 102. FIG. 2e to FIG. 2h show that the protrusions 200 can be in various shapes and/or sizes.

In one embodiment, as shown in FIG. 2a to FIG. 2c, the protrusions 200 can extend from one or both of the first face 102a and the second face 102b of the casing 102. FIG. 2a to FIG. 2c will be discussed later in further detail.

In another embodiment, as shown in FIG. 2d, the protrusions 200 can extend from the sides 102c of the casing 102. For example, a protrusion 200 can extend from each of the first to fourth corners 103a/103b/103c/103d of the casing 102. Further, in addition to the possibility that protrusions 200 can extend from the sides 102c of the casing, it is also possible that the protrusions 200 can extend from/relative to one or both of the first face 102a and the second face 102b of the casing 102. For example, it is possible that not only do the protrusions 200 extend from the sides 102c, it is also possible that they further extend from/relative to one or both of the first face 102a and the second face 102b. FIG. 2d will be discussed later in further detail.

Preferably, the number of protrusions 200 corresponds to the number of audio output portions 104. For example, as shown, the audio output portions 104 can include a first speaker driver 104a, a second speaker driver 104b, a third speaker driver 104c and a fourth speaker driver 104d. In this regard, the protrusions 200 can include a first protrusion, a second protrusion, a third protrusion and a fourth protrusion corresponding to the first speaker driver 104a, the second speaker driver 104b, the third speaker driver 104c and the fourth speaker driver 104d respectively.

Earlier mentioned, FIG. 2a to FIG. 2c show that the protrusions 200 can extend from one or both of the first face 102a and the second face 102b of the casing 102. FIG. 2a to FIG. 2c will be discussed in further detail hereinafter.

As shown in FIG. 2a, protrusions 200 can extend from the first face 102a of the casing 102.

In one embodiment, the protrusions 200 can correspond to the audio output portions 104 protruding from the first face 102a of the casing 102. For example, a protrusion 200 can correspond to an audio output portion 104 or at least a portion of an audio output portion 104 protruding from the first face 102a of the casing 102. In this regard, it is appreciable that at least a portion of an audio output portion 104 can be protruding from the first face 102a of the casing 102, and can thus be exposed to view. The at least a portion of the audio output portion 104, protruding from the casing 102 and exposed to view, can correspond to a protrusion 200.

In another embodiment, the casing 102 can be shaped and dimensioned in a manner so as to form the protrusions 200 such that they extend from the first face 102a of the casing 102. Additionally, the casing 102 can be shaped and dimensioned in a manner so as to form the protrusions 200 which can carry the audio output portions 104. For example, a protrusion 200 can carry a corresponding audio output portion 104 or at least a portion of a corresponding audio output portion 104. More specifically, for example, the first protrusion can carry the first speaker driver 104a or at least a portion of the first speaker driver 104a. The second to fourth protrusions can carry, respectively, the second to fourth speaker drivers 104b/104c/104d or at least a portion of the second to fourth speaker drivers 104b/104c/104d.

As shown in FIG. 2b, protrusions 200 can extend from the second face 102b of the casing 102.

In one embodiment, the protrusions 200 can correspond to the audio output portions 104 protruding from the second face 102b of the casing 102. For example, a protrusion 200 can correspond to an audio output portion 104 or at least a portion of an audio output portion 104 protruding from the second face 102b of the casing 102. In this regard, it is appreciable that at least a portion of an audio output portion 104 can be protruding from the second face 102b of the casing 102, and can thus be exposed to view. The at least a portion of the audio output portion 104, protruding from the casing 102 and exposed to view, can correspond to a protrusion 200.

In another embodiment, the casing 102 can be shaped and dimensioned in a manner so as to form the protrusions 200 such that they extend from the second face 102b of the casing 102. Additionally, the casing 102 can be shaped and dimensioned in a manner so as to form the protrusions 200 which can carry the audio output portions 104. For example, a protrusion 200 can carry a corresponding audio output portion 104 or at least a portion of a corresponding audio output portion 104. More specifically, for example, the first protrusion can carry the first speaker driver 104a or at least a portion of the first speaker driver 104a. The second to fourth protrusions can carry, respectively, the second to fourth speaker drivers 104b/104c/104d or at least a portion of the second to fourth speaker drivers 104b/104c/104d.

Additionally, the second face 102b can include one or more openings/perforations 202. Preferably, the second face 102b includes a plurality of openings/perforations 202. The number of openings/perforations 202 can be based on the number of audio output portions 104. Preferably, the number of openings/perforations 202 corresponds to the number of audio output portions 104. For example, the plurality of openings/perforations 202 can include a first opening/perforation, a second opening/perforation, a third opening/perforation and a fourth opening/perforation corresponding to the first speaker driver 104a, the second speaker driver 104b, the third speaker driver 104c and the fourth speaker driver 104d respectively.

Furthermore, as will be discussed in further detail with reference to FIG. 3, the openings/perforations 202 can be arranged on the second face 102b based on the arrangement of the audio output portions 104. Specifically, the arrangement of the openings/perforations 202 on the second face 102b can be dependent on the arrangement of the audio output portions 104.

Referring to FIG. 2c, a side view with reference to one of the sides 102c of the casing 102 is shown. Particularly, FIG. 2c's side view is a "see through" view which presents the arrangement of at least a portion of the audio output portions 104 within the casing 102. As shown, the protrusions 200 can extend from the first and second faces 102a/102b of the casing.

In one embodiment, the protrusions 200 can correspond to the audio output portions 104 protruding from one or both of the first and second faces 102a/102b of the casing 102. For example, a protrusion 200 can correspond to an audio output portion 104 or at least a portion of an audio output portion 104 protruding from one or both of the first and second faces 102a/102b of the casing 102. In this regard, it is appreciable that at least a portion of an audio output portion 104 can be protruding from one or both of the first and second faces 102a/102b of the casing 102, and can thus be exposed to view. The at least a portion of the audio output portion 104, protruding from the casing 102 and exposed to view, can correspond to a protrusion 200.

In another embodiment, the casing 102 can be shaped and dimensioned in a manner so as to form the protrusions 200 which can carry the audio output portions 104. Additionally, the casing 102 can be shaped and dimensioned to form the protrusions 200 in a manner such that they extend from one or both of the first and second faces 102a/102b of the casing 102. For example, a protrusion 200 can carry a corresponding audio output portion 104 or at least a portion of a corresponding audio output portion 104. More specifically, for example, the first protrusion can carry the first speaker driver 104a or at least a portion of the first speaker driver 104a. The second to fourth protrusions can carry, respectively, the second to fourth speaker drivers 104b/104c/104d or at least a portion of the second to fourth speaker drivers 104b/104c/104d.

Earlier mentioned, the number of protrusions 200 can correspond to the number of audio output portions 104. For example, where the number of audio output portions 104 is four (i.e., first to fourth speaker drivers 104a/104b/104c/104d), the number of protrusions 200 can be four (i.e., first to fourth protrusions).

The protrusions 200 discussed with reference to FIG. 2a to FIG. 2c can be helpful in protecting the electronic device 100. In one example, when the electronic device 100 is placed on a flat surface (not shown), direct contact between of the flat surface and any of the first face 102a, the second face 102b, the display module 105 and/or the image capture module 106 can be prevented. In this manner, scratches to the first face 102a, the second face 102b, the display module 105 and/or the image capture module 106 can be prevented. In another example, when the electronic device 100 is accidentally dropped from an elevated position (not shown), the protrusions 200 can help prevent substantial damage such as impact damage and/or shock damage to the first face 102a, the second face 102b, the display module 105 and/or the image capture module 106.

Earlier mentioned, FIG. 2d shows that the protrusions 200 can extend from the sides 102c of the casing 102. FIG. 2d will be discussed in further detail hereinafter.

Referring to FIG. 2d, the protrusions 200 can extend from the sides 102c of the casing 102. For example, the first protrusion, the second protrusion, the third protrusion and the fourth protrusion can extend from the first corner 103a, the second corner 103b, the third corner 103c and the fourth corner 103d respectively. Additionally, any of or any combination of the first to fourth protrusions can optionally extend from/relative to one or both of the first and second faces 102a/102b.

Thus it is appreciable that a protrusion 200 can, in one example, extend from a side 102c and, at the same time, extend relative to one or both of the first and second faces 102a/102b. In this regard, the protrusion 200 need not necessarily extend directly from one or both of the first and second faces 102a/102b.

In one embodiment, the protrusions 200 can correspond to the audio output portions 104 protruding from the sides 102c of the casing 102. The protrusions can further correspond to the audio output portions 104 protruding from/relative to one or both of the first face 102a and the second face 102b of the casing 102. For example, a protrusion 200 can correspond to an audio output portion 104 or at least a portion of an audio output portion 104 protruding from the first face 102a, the second face 102b and/or the side 102c of the casing 102. In this regard, it is appreciable that at least a portion of an audio output portion 104 can be protruding from/relative to one or both of the first and second faces 102a/102b and/or sides 102c of the casing 102, and can thus be exposed to view. The at least a portion of the audio output portion 104, protruding from the casing 102 and exposed to view, can correspond to a protrusion 200.

In another embodiment, the casing 102 can be shaped and dimensioned in a manner so as to form the protrusions 200 which can carry the audio output portions 104. For example, a protrusion 200 can carry a corresponding audio output portion 104 or at least a portion of a corresponding audio output portion 104. More specifically, for example, the first protrusion can carry the first speaker driver 104a or at least a portion of the first speaker driver 104a. The second to fourth protrusions can carry, respectively, the second to fourth speaker drivers 104b/104c/104d or at least a portion of the second to fourth speaker drivers 104b/104c/104d.

Earlier mentioned, the number of protrusions 200 can correspond to the number of audio output portions 104. For example, where the number of audio output portions 104 is four (i.e., first to fourth speaker drivers 104a/104b/104c/104d), the number of protrusions 200 can be four (i.e., first to fourth protrusions).

Earlier discussed with reference to FIG. 2a to FIG. 2c, the protrusions 200 can be helpful in protecting the electronic device 100. In the case of FIG. 2d, in addition to protecting the electronic device 100, the protrusions 200 extending from the first face 102a, the second face 102b and/or the sides 102c of the casing 102 can further be useful in a situation where more powerful speaker drivers (e.g., the first to fourth speaker drivers 104a/104b/104c/104d) are desired.

Speaker drivers which are associated with more power (i.e., speaker drivers having higher power ratings) may have larger physical dimensions compared to their lower powered counterparts (i.e., speaker drivers having lower power ratings). Thus to incorporate higher powered speaker drivers (i.e., audio output portions 104), there may be a need to increase the electronic device 100 real estate. Increasing the electronic device 100 real estate may render the electronic device 100 bulky and aesthetically unpleasing. Thus increasing the electronic device 100 real estate to accommodate higher powered speaker drivers may be undesirable.

Appreciably, by having protrusions 200 extending from the first face 102a, the second face 102b and/or the sides 102c of the casing 102, a speaker driver or at least a portion of a speaker driver can effectively be protruding from the first face 102a, the second face 102b and/or the sides 102c of the casing 102. In such a case, if speaker drivers having larger physical dimensions are to be used in the electronic device 100, the need to increase the electronic device 100 real estate may be mitigated.

Furthermore, the protrusions 200 can be such that they are shaped and dimensioned not to be too noticeable/not too obstructive such that the electronic device 100 is not rendered aesthetic unpleasing. For example, the protrusions 200 can be in the form of curved/enlarged rounded corners. More specifically, for example, the first to fourth corners 103a/103b/103c/103d can be enlarged so as to allow corresponding first to fourth speaker drivers 104a/104b/104c/104d to effectively protrude from the first face 102a, the second face 102b and/or the sides 102c of the casing 102. Moreover, the protrusions 200 can be in various shapes and/or sizes as shown in, but not limited to, FIG. 2e to FIG. 2h.

In this manner, speaker drivers having larger physical dimensions (e.g., speaker drivers having higher power ratings compared to speaker drivers having lower power ratings) can be used in the electronic device 100 without having to significantly increase the electronic device 100 real estate and/or without having to render the electronic device 100 aesthetically unpleasing.

Figure 3A:
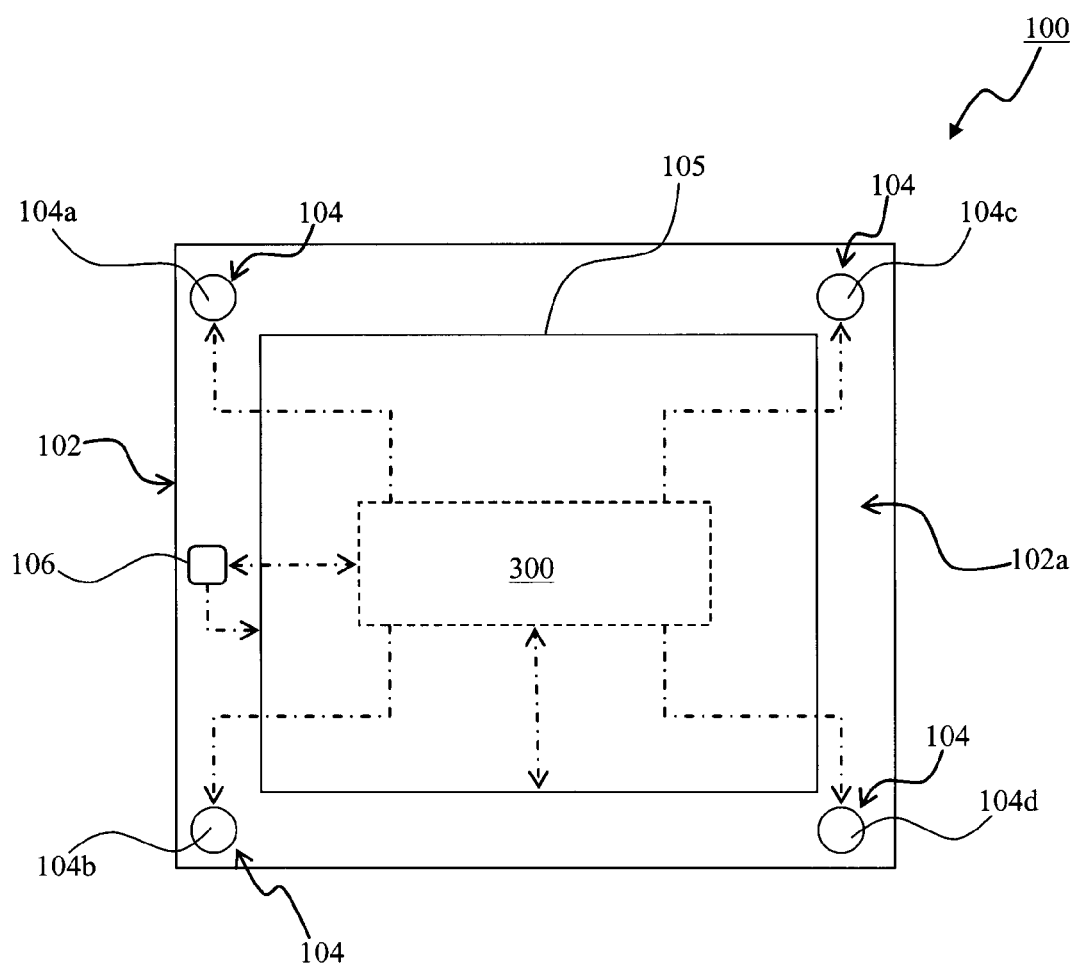
FIG. 3a shows that the electronic device can further include a processing portion, according to an embodiment of the disclosure.

FIG. 3a provides a plane view of the electronic device 100 looking at and/or through the first face 102a of the casing 102. As shown, the electronic device 100 can further include a processing portion 300. The casing 102 can be shaped and dimensioned to carry the processing portion 300. For example, the processing portion 300 can be disposed within the casing 102.

The processing portion 300 can be coupled to one or both of the display module 105 and the image capture module 106. Additionally, the image capture module 106 can be coupled to one or both of the display module 105 and the processing portion 300. Moreover, the photonic based detectors/sensors can be coupled to the processing portion 300 and/or the display module 105. The processing portion 300 can be further coupled to the audio output portions 104.

The display module 105 can be configured to communicate input signals to the processing portion 300. The processing portion 300 can be configured to receive and process the input signals to produce output signals. The output signals can be communicated to the display module 105. The display module 105 can be further configured to display the output signals.

The image capture module 106 can be configured to capture images and communicate image signals based on the captured images. Image signals can be communicated from the image capture module 106 to one or both of the display module 105 and the processing portion 300. Image signals can be communicated from the image capture module 106 to the display module 105 for display. Image signals can be communicated from the image capture module 106 to the processing portion 300 for further processing to produce processed image signals. Processed image signals can be communicated from the processing portion 300 to the display module 105 for display.

The photonic based detectors/sensors can be configured to sense/detect optical signals such as IR signals. The photonic based detectors/sensors can be further configured to communicate the detected optical signals to one or both of the display module 105 and the processing portion 300. The optical signals can be communicated from the photonic based detectors/sensors to the processing portion 300 for processing to produce processed optical signals.

Earlier mentioned the audio output portions 104 can, for example, include a first speaker driver 104a, a second speaker driver 104b, a third speaker driver 104c and a fourth speaker driver 104d. In this regard, the processing portion 300 can be coupled to each of the first to fourth speaker drivers 104a/104b/104c/104d.

The processing portion 300 can be configured to communicate audio signals to each or any combination of the first to fourth speaker drivers 104a/104b/104c/104d for output. Thus the audio output portions 104 can be configured to output audio signals communicated from the processing portion 300 as will be discussed in further detail with reference to FIG. 3b and FIG. 3c.

Figure 3B:
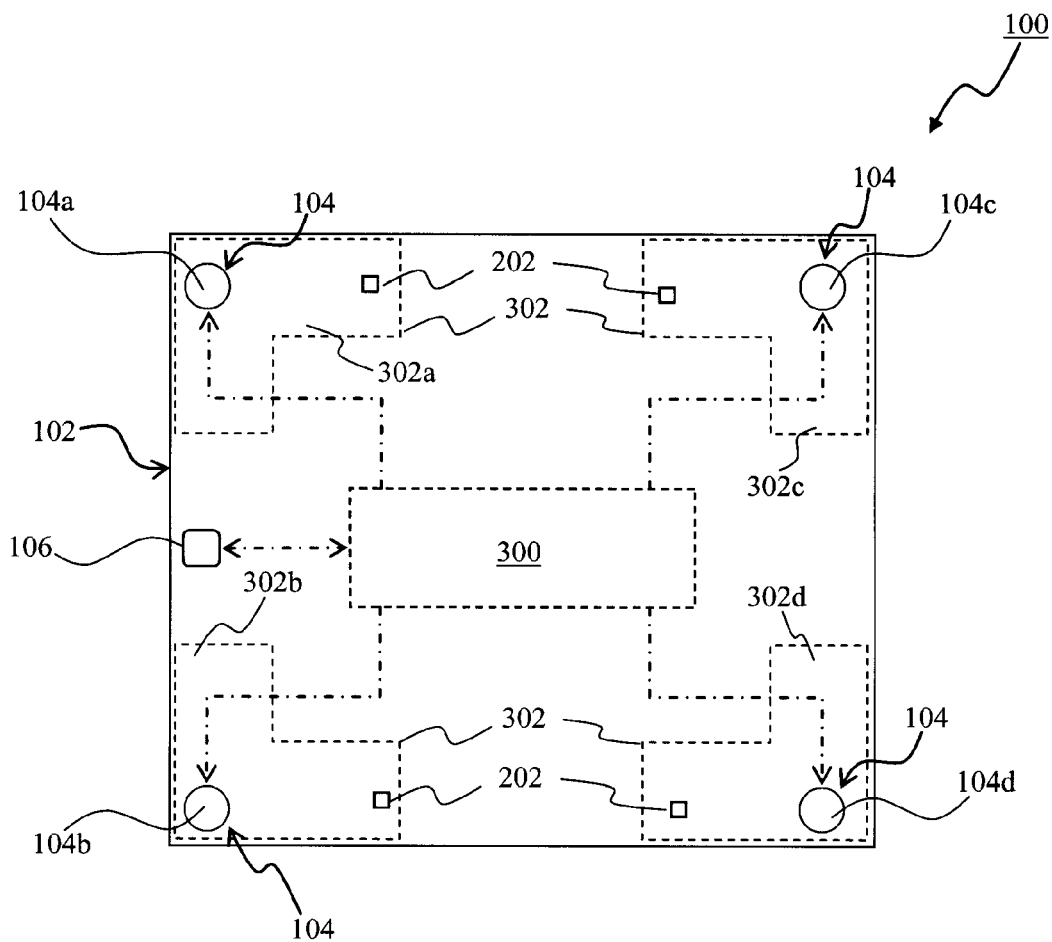
FIG. 3b shows that electronic device can further include one or more enclosures, according to an embodiment of the disclosure.
Figure 3C:
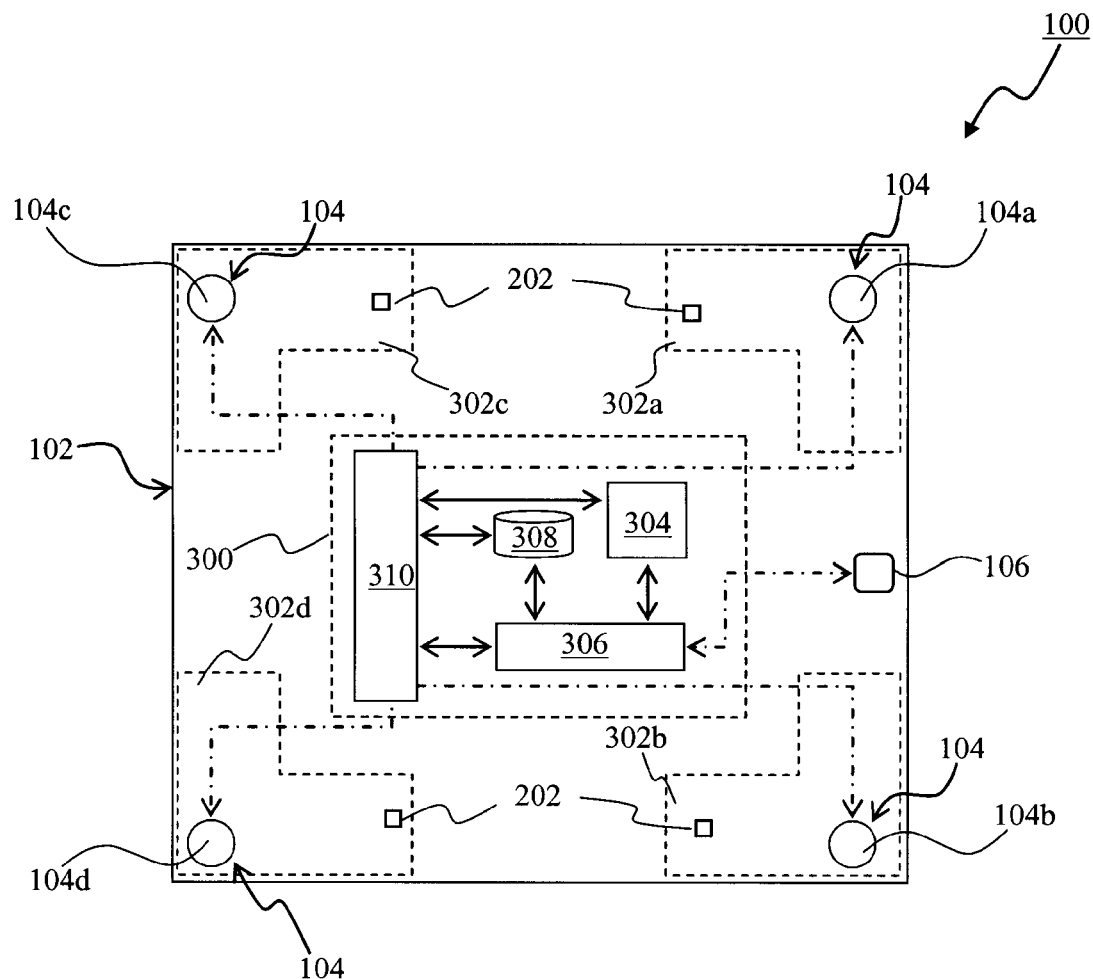
FIG. 3c shows the processing portion of FIG. 3a in further detail, according to an embodiment of the disclosure.

In addition, the electronic device 100 and the processing portion 300 will be shown in further detail with reference to FIG. 3b and FIG. 3c. For the sake of clarity, the display module 105 will not be shown in FIG. 3b and FIG. 3c.

Referring to FIG. 3b, the electronic device 100 can further include one or more enclosures 302. Particularly, the casing 102 of the electronic device 100 can be shaped and dimensioned to carry one or more enclosures 302. More particularly, the enclosures 302 can be formed within the casing 102. For example, the casing 102 can be shaped and dimensioned in a manner so as to form the enclosures 302 within the casing 102.

Preferably, the number or enclosures 302 corresponds to the number of audio output portions 104. Each audio output portion 104 can be substantially enclosed/surrounded by an enclosure 302.

For example, the audio output portions 104 can include a first speaker driver 104a, a second speaker driver 104b, a third speaker driver 104c and a fourth speaker driver 104d. In this regard, the number of audio output portions 104 is four. Therefore, there can be four enclosures 302. For example, there can be a first enclosure 302a, a second enclosure 302b, a third enclosure 302c and a fourth enclosure 302d substantially surrounding/enclosing the first speaker driver 104a, the second speaker driver 104b, the third speaker driver 104c and the fourth speaker driver 104d respectively.

Earlier mentioned, openings/perforations 202 can be arranged on the second face 102b based on the arrangement of the audio output portions 104. Specially, at least one opening/perforation 202 can be defined or provided within an enclosure 302. For example, an opening/perforation 202 can be defined or provided in each of the aforementioned first enclosure to fourth enclosure 302a/302b/302c/302d.

Earlier mentioned, each enclosure 302 can be shaped and dimensioned in a manner so as to surround/enclose an audio output portion 104. Thus the audio output portions 104 determine the arrangement of the one or more enclosures 302 within the casing 102. Furthermore, at least one opening/perforation can be defined or provided within each of the one or more enclosures 302. In this manner, the arrangement of the openings/perforations 202 on the second face 102b can be considered to be dependent on the arrangement of the audio output portions 104.

The enclosures 302 and corresponding openings/perforations 202 can facilitate equalizing of pressure. Specifically pressure in the enclosures 302 can be equalized with respect to the environment (i.e., outside of the electronic device 100). This is made possible by the openings/perforations 202. Appreciably, to facilitate pressure equalizing, the openings/perforations 202 should not be substantially obstructed/blocked.

Earlier mentioned, in one embodiment, protrusions 200 can extend from the second face 102b of the casing 102. Thus in a situation where the electronic device 100 is placed on a flat surface such as a tabletop with the second face 102b facing the flat surface, it is appreciable that the protrusions 200 can effectively elevate the electronic device 100 from the flat surface such that the openings/perforations 202 on the second face 102b are not covered/blocked by the flat surface. In this manner, the openings/perforations 202 remain substantially unobstructed even if the electronic device 100 is placed on a flat surface with the second face 102b facing the flat surface.

By allowing pressure equalizing, audio output performance, especially audio output performance of low frequency range audio signals (i.e., bass audio range), can be improved. In this regard, the enclosures 302 and perforations/openings 202 can function as some form of bass tuning to improve audio output performance of low frequency range audio signals. Thus audio output performance, especially bass performance, of the electronic device 100 can be improved.

Audio signals and frequency ranges (i.e., low frequency range audio signals as mentioned above, mid frequency range audio signals and/or high frequency range audio signals) associated with audio signals will be discussed later in further detail.

FIG. 3c shows the processing portion 300 in further detail. As shown, the processing portion 300 can include a sensor unit 304, a central processor unit 306, a storage unit 308 and an audio processor unit 310.

The sensor unit 304 can be coupled to one or both of the central processor unit 306 and the audio processor unit 310. The central processor unit 306 can be coupled to one or both of the display module 105 and the image capture module 106. The central processor unit 306 can be further coupled to any of, or any combination of, the sensor unit 304, the storage unit 308, the audio processor unit 310 and the aforementioned one or more photonic based sensors/detectors. Additionally, the storage unit 308 can be coupled to one or both of the central processor unit 306 and the audio processor unit 310. The audio processor unit 310 can be coupled to the audio output portions 104.

The sensor unit 304 can be configured to sense/detect, for example, orientation and/or movement of the electronic device 100 as will be discussed later in further detail with reference to FIG. 4. The sensor unit 304 can, for example, be a device such as a gyroscope, a digital compass or an accelerometer. Thus the sensor unit 304 can, for example, correspond to one or more gyroscopes, one or more digital compasses and/or one or more accelerometers.

The central processor unit 306 can be coupled to the display module 105 in a manner so as to receive input signals communicated from the display module 105. The central processor unit 306 can be further coupled to the image capture module 106 in a manner so as to receive image signals communicated from the image capture module 106. The central processor unit 306 can yet be further coupled to the sensor unit 304 in a manner so as to receive sensor signals communicated from the sensor unit 304. Moreover, the central processor unit 306 can be coupled to the one or more photonic based sensors/detectors in a manner so as to receive optical signals detected by and communicated from the one or more photonic based sensors/detectors.

The central processor portion 306 can be configured to process any one of, or any combination of, the input signals, image signals, sensor signals and optical signals to produce one or both of control signals and output signals. The central processor unit 306 can be further configured to process image signals and the optical signals to produce processed image signals and processed optical signals respectively. The output signals, the processed image signals and/or the processed optical signals can be communicated from the central processor unit 306 to the display module 105 for display.

The control signals can be communicated from the central processor unit 306 to any of the sensor unit 304, the storage unit 308 and the audio processor unit 310, or any combination thereof. Therefore control signals can be communicated from the central processor unit 306 to control the sensor unit 304, the storage unit 308 and/or the audio processor unit 310.

Appreciably, control signals can be produced by the central processor unit 306 based on the input signals, the image signals, optical signals and/or the sensor signals.

The storage unit 308 can be configured to store one or more electronic audio files such as MP3, MP4 and WMA based audio files. An audio file can be associated with audio signals having audio characteristics such as frequency characteristics and phase characteristics. Other examples of audio characteristics can include amplitude and channel characteristics.

Frequency characteristics of an audio file can relate to the frequency of each audio signal associated with the audio file. Thus appreciably, an audio file can be associated with a plurality of frequency ranges. The plurality of frequency ranges can, for example, include low frequency range audio signals (e.g., between 20 Hz and 200 Hz), mid frequency range audio signals (e.g., between 201 Hz and 5 KHz) and/or high frequency range audio signals (e.g., between more than 5 KHz and 20 KHz).

Additionally, an audio signal, when recorded, can be recorded in a manner such that it is more suitably audibly perceived by either the left ear of a user or a right ear of a user. In this regard, an audio file may include audio signals that are more suitable for audio perception by the left ear of a user. An audio file may further include audio signals that are more suitable for audio perception by the right ear of the user. An audio file may yet further include audio signals that are suitable for audio perception by the left and right ears of a user. Therefore an audio signal can be associated with audio characteristics which may be indicative of appropriate channel output.

Thus channel characteristics of an audio signal can relate to appropriate channel output.

For example, as will also be discussed later with reference to FIG. 4, a speaker system having at least a left channel speaker output and a right channel speaker output can be configured to output audio output signals based on an audio file. Audio signals associated with the audio file recorded to be more suitably perceived audibly by the left ear of a user can be associated with channel characteristics indicative that they should be more appropriately output via the left channel speaker output. Audio signals associated with the audio file recorded to be more suitably perceived audibly by the right ear of the user can be associated with channel characteristics indicative that they should be more appropriately output via the right channel speaker output.

In this regard, channel characteristics of audio signals can relate to at least of one of left channel output and right channel output. Left channel output can relate to the aforementioned output of audio signals via the left channel speaker output of a speaker system. Right channel output can relate to the aforementioned output of audio signals via the right channel speaker output of a speaker system.

The storage unit 308 can be configured to communicate an electronic audio file to the audio processor unit 310 based on control signals received from the central processor unit 306. Of course, it is understood that the storage unit 308 can be located in the electronic device 100 and/or in a remote location outside of the electronic device 100. In this regard, electronic audio files can be communicated to the audio processor unit 310 from a remote location via a communication network. In one example, electronic audio files can be streamed from the internet. In another example, the storage unit 308 can be associated with Cloud based storage.

The audio processor unit 310 can be configured to process the electronic audio file in a manner so as to produce audio output signals which can be communicated to and output at the audio output portions 104.

In this regard, audio processor unit 310 can be configured to receive audio signals associated with the audio file for processing to produce audio output signals. Therefore audio signals received by the audio processor unit 310 can be considered to be audio input signals. Thus audio input signals can be received and processed by the audio processor unit 310 to produce audio output signals.

Audio input signals can, for example, be processed by the audio processor unit 310 such that audio characteristics of the audio input signals can be varied based on one or both of control signals and sensor signals as will be discussed later in further detail with reference to FIG. 4. For example, any one of, or any combination of, frequency characteristics, phase characteristics and amplitude of audio input signals can be varied by the audio processor unit 310.

The audio processor unit 310 can be further configured to vary/control output of the audio output signals based on one or both of control signals and sensor signals as will be discussed in further detail later with reference to FIG. 4.

In one example, output of the audio output signals can be varied/controlled in the context of directivity of output of the audio output signals. In another example, output of the audio output signals can be varied/controlled in the context of allowing and/or impeding output of audio output signals via at least a portion of the audio output portions 104. In yet another example, output of the audio output signals can be varied/controlled in the context of channel output of the audio output signals. In yet a further example, output of the audio output signals can be varied/controlled in the context of directivity of output of the audio output signals, channel output of the audio output signals and allowing and/or impeding output of audio output signals via at least a portion of the audio output portions 104. Other examples include varying/controlling audio output signals in the context of three dimensional (3D) audio positioning on the output of the audio output signals.

The manner in which audio characteristics of the audio input signals can be varied, by the audio processor unit 310, based on one or both of control signals and sensor signals and/or the manner in which the audio processor unit 310 can be further configured to vary/control output of the audio output signals based on one or both of control signals and sensor signals will be discussed in further detail hereinafter with reference with FIG. 4.

FIG. 4a shows the electronic device 100 positioned in a first orientation 400a relative to a user 410. FIG. 4b shows the electronic device 100 positioned in a second orientation 400b relative to a user 410.

Referring to FIG. 4a, the first orientation 400a can, for example, be a landscape orientation. Therefore, the electronic device 100 can be positioned in a landscape orientation relative to the user 410. Referring to FIG. 4b, the second orientation 400b can, for example, be a portrait orientation. Therefore, the electronic device 100 can be positioned in a portrait orientation relative to the user 410.

The manner in which the audio processor unit 310 can be configured to vary/control output of the audio output signals based on one or both of control signals and sensor signals will be first discussed followed by the manner in which audio characteristics of the audio input signals can be varied, by the audio processor unit 310, based on one or both of control signals and sensor signals.

Earlier mentioned, output of the audio output signals can be varied/controlled in the context of:
1) directivity of output of the audio output signals;
2) channel output of the audio output signals;
3) allowing and/or impeding output of audio output signals via at least a portion of the audio output portions 104; and/or
4) 3D audio positioning on the output of the audio output signals.

Based on the first orientation 400a and the second orientation 400b, audio output signals can be output via the audio output portions 104 in a first set of directions 420 and a second set of directions 430 respectively. In this regard, output of audio output signals based on the first orientation 400a and the second orientation 400b can be associated with a first set of directions 420 and a second set of directions 430 respectively.

The first set of directions 420 and the second set of directions 430 can, for example, be such that audio signals are output from each of the first to fourth speaker drivers 104a/104b/104c/104d in a direction towards the user 410. Directivity of output of the audio output signals can correspond to output of the audio output signals in the first set of directions 420 and/or the second set of directions 430.

In an exemplary scenario where the orientation of the electronic device 100 is changed from the first orientation 400a to the second orientation 400b, it is appreciable that, in the second orientation 400b, the position of each of the first to fourth speaker drivers 104a/104b/104c/104d relative to the user 410 may be changed as compared to the position of each of the first to fourth speaker drivers 104a/104b/104c/104d relative to the user 410 when in the first orientation 400a.

Therefore, based on the change in positions of the first to fourth speaker drivers 104a/104b/104c/104d relative to the user 410 due to the change in orientation (e.g., from the first orientation 400a to the second orientation 400b) of the electronic device 100, it may be desirable to change direction of output of audio output signals via each of the audio output portions 104 from the first set of directions 420 to the second set of directions 430.

Appreciably, by changing directivity of output of audio output signals from the first set of directions 420 to the second set of directions 430, directivity of output of the audio output signals from each of the first to fourth speaker drivers 104a/104b/104c/104d can be considered to be varied/changed when the orientation of the electronic device 100 is changed from the first orientation 400a to the second orientation 400b.

Of course, although the foregoing exemplary scenario discusses change in direction of output signals of audio output signals from each of the first to fourth speaker drives 104a/104b/104c/104d in the context of the first set of directions 420 and the second set of directions 430 being toward the user 410, it is appreciable that one or more portions of the first set of directions 420 and the second set of directions 430 can be away from the user 410.

For example, when in the first orientation 400a, the first and third speaker drivers 104a/104c can be configured to output audio output signals away from the user 410. The second and fourth speaker drivers 104b/104d can be configured to output audio output signals toward the user 410. When in the second orientation 400b, the first and second speaker drivers 104a/104b can be configured to output audio output signals away from the user 410 instead of the first and third speaker drivers 104a/104c when in the first orientation 400a. Additionally, when in the second orientation 400b, the third and fourth speaker drivers 104c/104d can be configured to output audio output signals toward the user 410 instead of the second and fourth speaker drivers 104b/104d when in the first orientation 400a.

In a more specific example, when the electronic device 100 is in the first orientation 400a, the first speaker driver 104a can be configured to output audio output signals at a direction towards a predetermined location which is a distance from the left of the user 410 and the third speaker driver 104c can be configured to output audio output signals at a direction towards a predetermined location which is a distance from the right of the user 410. Additionally, when in the first orientation 400a, the second and fourth speaker drivers 104b/104d can be configured to output audio output signals toward the user 410. When there is a change in orientation of the electronic device 100 from the first orientation 400a to the second orientation 400b, the first speaker 104a can be configured to output audio output signals at a direction towards a predetermined location which is a distance from the right of the user 410 and the second speaker driver 104b can be configured to output audio output signals at a direction towards a predetermined location which is a distance from the left of the user 410. Additionally, when in the second orientation 400b, the third and fourth speaker drivers 104c/104d can be configured to output audio output signals toward the user 410.

Apart from controlling/varying output of audio output signals in the context of directivity of output of audio output signals from the audio output portions 104, it is also possible to control/vary output of audio output signals in the context of channel output of the audio output signals.

Earlier mentioned, a speaker system having at least a left channel speaker output and a right channel speaker output can be configured to output audio output signals based on an audio file.

Audio signals associated with the audio file recorded to be more suitably perceived audibly by the left ear of a user can be associated with channel characteristics indicative that they should be more appropriately output via the left channel speaker output.

The audio output portions 104 of the electronic device 100 can be considered to be a speaker system.

In this regard, when in the first orientation 400*a*, the first and second speaker drivers 104*a*/104*b* can be considered to be the aforementioned left channel speaker output. The third and fourth speaker drivers 104*c*/104*d* can be considered to be the aforementioned right channel speaker output.

Furthermore, when in the second orientation 400*b*, the second and fourth speaker drivers 104*b*/104*d* can be considered to be the aforementioned left channel speaker output. The first and third speaker drivers 104*a*/104*c* can be considered to be the aforementioned right channel speaker output.

Audio input signals associable with left channel output audio characteristics can be processed by, for example, the audio processor unit 310 to produce audio output signals associable with left channel output audio characteristics. Furthermore, audio input signals associable with right channel output audio characteristics can be processed by, for example, the audio processor unit 310 to produce audio output signals associable with right channel output audio characteristics.

When the electronic device 100 is initially positioned in the first orientation 400*a*, audio output signals associable with left channel output audio characteristics can be output by the first speaker driver 104*a* and/or second speaker driver 104*b*. Additionally, audio output signals associable with right channel output audio characteristics can be output by the third speaker driver 104*c* and/or fourth speaker driver 104*d*.

When orientation of the electronic device 100 is changed from the first orientation 400*a* to the second orientation 400*b*, audio output signals associable with left channel output audio characteristics can be output by the second speaker driver 104*b* and/or fourth speaker driver 104*d*. Additionally, audio output signals associable with right channel output audio characteristics can be output by the first speaker driver 104*a* and/or third speaker driver 104*c*.

In this regard, when the electronic device 100 is positioned in the first orientation 400*a*, a portion of the audio output portions 104 (e.g., the first speaker driver 104*a* and second speaker driver 104*b*) can be considered to be left channel speaker output and another portion of the audio output portions 104 (e.g., the third speaker driver 104*c* and fourth speaker driver 104*d*) can be considered to be right channel speaker output. Furthermore, when the electronic device 100 is positioned in the second orientation 400*b*, a portion of the audio output portions 104 (e.g., the second speaker driver 104*b* and fourth speaker driver 104*d*) can be considered to be left channel speaker output and another portion of the audio output portions 104 (e.g., the first speaker driver 104*a* and third speaker driver 104*c*) can be considered to be right channel speaker output.

Therefore, it is appreciable that the portion of audio output portions 104 considered to be left channel speaker output in the first orientation 400*a* and the portion of audio output portions 104 considered to be left channel speaker output in the second orientation 400*b* can be different. Similarly, the portion of audio output portions 104 considered to be right channel speaker output in the first orientation 400*a* and the portion of audio output portions 104*b* considered to be right channel speaker output in the second orientation 400*b* can be different.

It is further appreciable that audio output signals associable with left channel output audio characteristics can be output by the left channel speaker output regardless of change in orientation of the electronic device 100. Similarly, audio output signals associable with right channel output audio characteristics can be output by the right channel speaker output regardless of change in orientation of the electronic device 100.

In one embodiment, the audio processor unit 310 can be configured in a manner so as to allow output of audio output signals associable with left channel output audio characteristics and audio output signals associable with right channel output audio characteristics by the aforementioned left channel speaker output and right channel speaker output respectively.

Apart from controlling/varying output of audio output signals in the context of directivity of output of audio output signals from the audio output portions 104 and/or control/vary output of audio output signals in the context of channel output of the audio output signals, it is also possible to control/vary output of audio output signals in the context of allowing and/or impeding output of audio output signals via at least a portion of the audio output portions 104.

Particularly, in one embodiment, it is also possible to impede output of one or more specific frequency ranges of the aforementioned plurality of frequency ranges via at least a portion of the audio output portions 104. For example, it is possible to impede output of any of, or any combination of, the low frequency range audio signals, the mid frequency range audio signals and the high frequency range audio signals via any of, or any combination of, the aforementioned first to fourth speaker drivers 104*a*/104*b*/104*c*/104*d*.

In another embodiment, it is also possible to allow only output of one or more specific frequency ranges of the plurality of frequency ranges via at least a portion of the audio output portions 104. For example, it is possible to specifically allow only output of any of, or any combination of, the low frequency range audio signals, the mid frequency range audio signals and the high frequency range audio signals via any of, or any combination of, the aforementioned first to fourth speaker drivers 104*a*/104*b*/104*c*/104*d*.

In yet another embodiment, it is also possible to allow only output of one or more specific frequency ranges of the plurality of frequency ranges via at least a portion of the audio output portions 104 and, at the same time, impede output of one or more specific frequency ranges of the plurality of frequency ranges via at least a portion of the audio output portions 104.

In an exemplary situation, when the electronic device 100 is in the first orientation 400*a*, at least a portion of the audio output portions 104 such as the first and third speaker drivers 104*a*/104*c* can be configured to allow output of only high and mid frequency range audio signals associated with an audio file. Additionally, at least a portion of the audio output portions 104 such as the second and fourth speaker drivers 104*b*/104*d* can be configured to impede output of high and mid frequency range audio signals and allow only output of low frequency range audio signals associated with an audio file.

Further, in the exemplary situation, when there is a change in orientation of the electronic device 100 (e.g., from the first orientation 400a to the second orientation 400b), the first and second speaker drivers 104a/104b can be configured to allow output of only high and mid frequency range audio signals associated with an audio file instead of the first and third speaker drivers 104a/104c when in the first orientation 400a. Additionally, when in the second orientation 400b, the third and fourth speaker drivers 104c/104d can be configured to impede output of high and mid frequency range audio signals and allow only output of low frequency range audio signals associated with an audio file instead of the second and fourth speaker drivers 104b/104d when the electronic device 100 is in the first orientation 400a.

Apart from controlling/varying output of audio output signals in the context of directivity of output of audio output signals from the audio output portions 104, control/vary output of audio output signals in the context of channel output of the audio output signals and/or control/vary output of audio output signals in the context of allowing and/or impeding output of audio output signals via at least a portion of the audio output portions 104, it is also possible to control/vary output of audio output signals in the context of 3D audio positioning on the output of the audio output signals.

In general, 3D audio positioning can be considered to be a group of sound processing algorithm which can manipulate audio image produced by the audio output portions 104. This may be related to virtual placement of sound sources in three dimensional space such as behind, below and/or above the user 410.

For example, when the electronic device 100 is in the first orientation 400a, the audio output portions 104 may be configured to output audio output signals in a manner such that the audio image produced can be audibly perceived by the user 410 to be above him/her (i.e., the user 410). When there is a change in orientation of the electronic device 100 (e.g., from the first orientation 400a to the second orientation 400b), the audio output portions 104 may be configured to output audio output signals in a manner such that the audio image produced can be audibly perceived by the user 410 to be below him/her (i.e., the user 410).

Output of the audio output signals can be varied/controlled based on sensor signals communicated from the sensor unit 304. The sensor unit 304 can be configured to sense/detect change in orientation of the electronic device 100 and communicate sensor signals indicative of change in orientation of the electronic device 100.

For example, sensor signals can be communicated from the sensor unit 304 to the audio processor unit 310. The audio processor unit 310 can be configured to control/vary output of the audio output signals based on the sensor signals.

Alternatively, output of the audio output signals can be varied/controlled based on control signals communicated from the central processor unit 306.

In one embodiment, sensor signals can be communicated from the sensor unit 304 to the central processor unit 306. The central processor unit 306 can be configured to receive and process the sensor signals to produce control signals which can be communicated to the audio processor unit 310. The audio processor unit 310 can be configured to control/vary output of the audio output signals based on the control signals. In this regard, the control signals can be indicative of change in orientation of the electronic device 100.

In another embodiment, image signals can be communicated from the image capture module 106. Image signals can be based on captured images of one or more user gestures. For example, the user 410 can, by waving his/her hand or moving his/her finger, provide a circular motion based gesture. The circular motion based gesture can, for example, be indicative of change in orientation of the electronic device 100. Image signals based on captured images of one or more user gestures such as the aforementioned circular motion based gesture can be communicated to the central processor unit 306 for processing to produce control signals. The control signals can be communicated to the audio processor unit 310. The audio processor unit 310 can be configured to control/vary output of the audio output signals based on the control signals.

In yet another embodiment, the audio processor unit 310 can be configured to control/vary output of the audio output signals based on the sensor signals and the control signals.

Therefore, it is appreciable that controlling/varying output of audio output signals need not necessarily be based on physical positioning/physical change in orientation of the electronic device 100. Controlling/varying the output of audio output signals can also be possible even if the electronic device 100 remains stationary. For example, output of audio output signals can be varied/controlled based on captured images of one or more user gestures.

Earlier mentioned, audio characteristics of the audio input signals can be varied/controlled, by the audio processor unit 310, based on one or both of control signals and sensor signals.

Audio characteristics can include any of, or any combination of, frequency characteristics, phase characteristics and amplitude.

Preferably, prior to varying/controlling output of the audio output signals due to, for example, change in orientation/movement of the electronic device 100, the audio output portions 104 can be calibrated. Therefore the audio output portions can be initially calibrated prior to change in, for example, orientation/movement of the electronic device 100. In one example, the audio output portions 104 can be calibrated in a manner such that audio characteristics of audio output signals being output from each of the audio output portions 104 are substantially similar to audio characteristics of the audio input signals. Specifically, audio characteristics of the audio input signals remain substantially unchanged when they are output as audio output signals from each of the audio output portions. In another example, the audio output portions 104 can be calibrated in a manner so as to compensate/balance output of audio output signals. Specifically, in one example, if the aforementioned left channel output is audibly perceived to be louder than the aforementioned right channel output, the audio output portions 104 can be calibrated to compensate, by manner of boosting, the loudness of the aforementioned right channel output so that the loudness of the left channel output and the right channel output can be audibly perceived to be balanced. Conversely, the audio output portions 104 can be calibrated to compensate, by manner of attenuating, the loudness of the aforementioned left channel output so that the loudness of the left channel output and the right channel output can be audibly perceived to be balanced. Other examples include calibrating the audio output portions 104 such that the frequency response of the left channel output and the frequency response of the right channel output are substantially similar initially (i.e., prior to, for example, change in orientation of the electronic device 100). In this regard the audio output portions 104 can generally be calibrated such that they can have an initial output response (i.e., initial frequency response/initial loudness etc) prior to, for example, change in orientation of the electronic device 100. Yet other examples include calibrating the audio output portions 104 to compensate for difference in the shape/size of the enclosures 302. For example, there can be a difference in shape/size between the first enclosure 302a and the second enclosure 302b. Appreciably, the difference in shape and size may cause some variance in the aforementioned audio characteristics. By calibrating the audio output portions 104, such variance can be at least reduced or rendered insignificant/negligible.

In one embodiment, based on one or both of control signals and sensor signals, frequency characteristics of the audio input signals can be varied/controlled. For example, referring to FIG. 3c, FIG. 4a and FIG. 4b, the audio processor unit 310 can be configured to one or both of boost and attenuate signal amplitudes of low frequency range audio signals in a manner such that low frequency range audio output signals being output via the second and fourth speaker drivers 104b/104d can be boosted whereas low frequency range audio output signals being output via the first and third speaker drivers 104a/104c can be attenuated when the electronic device 100 is in the first orientation 400a.

When orientation of the electronic device 100 is changed from the first orientation 400a to the second orientation 400b, the audio processor unit 310 can be configured to one of boost and attenuate signal amplitudes of low frequency range audio signals in a manner such that low frequency range audio output signals being output via the third and fourth speaker drivers 104c/104d can be boosted whereas low frequency range audio output signals being output via the first and second speaker drivers 104a/104b can be attenuated.

In another embodiment, based on one or both of control signals and sensor signals, phase characteristics of the audio input signals can be varied/controlled. For example, referring to FIG. 3c, FIG. 4a and FIG. 4b, the audio processor unit 310 can be configured process audio input signals by phase shifting audio input signals such there is a phase shift between the audio output signals being output at the audio output portions 104.

Specifically, when the electronic device 100 is in the first orientation 400a, the audio processor unit 310 can be configured to process audio input signals by phase shifting audio input signals such that there is a, for example, 45 degree phase shift between the audio output signals being output via the first and second speaker drivers 104a/104b. Similarly, there can be, for example, a 45 degree phase shift between the audio output signals being output via the third and fourth speaker drivers 104c/104d when the electronic device 100 is in the first orientation 400a.

When orientation of the electronic device 100 is changed from the first orientation 400a to the second orientation 400b, the audio processor unit 310 can be configured to process audio input signals by phase shifting audio input signals such that there is a, for example, 90 degree phase shift between the audio output signals being output via the first and third speaker drivers 104a/104c. Similarly, there can be, for example, a 90 degree phase shift between the audio output signals being output via the second and fourth speaker drivers 104b/104d when the electronic device 100 is in the second orientation 400b.

Controlling/varying audio characteristics of the audio input signals by the audio processor unit 310 based on one or both of control signals and sensor signals can be analogous to the earlier discussion regarding controlling/varying output of audio output signals based on one or both of control signals and sensor signals.

In one example, the audio processor unit 310 can be configured to control/vary audio characteristics of audio input signals based on the sensor signals communicated from the sensor unit 304. In another example, the audio processor unit 310 can be configured to control/vary audio characteristics of audio input signals based on the control signals communicated from the central processor 306.

Additionally, as with controlling/varying output of audio signals, controlling/varying audio characteristics of audio input signals need not necessarily be based on physical positioning/physical change in orientation of the electronic device 100. Controlling/varying the audio characteristics of audio input signals can also be possible even if the electronic device 100 remains stationary. For example, audio characteristics of audio input signals can be varied/controlled based on the aforementioned captured images of one or more user gestures.

Based on the foregoing, it is easily appreciable that the electronic device 100 facilitates audio playback (i.e., output of audio output signals) in a substantially more user friendly and/or efficient manner as compared to conventional electronic audio reproduction device. For example, directivity of output of audio output signals from the electronic device 100 can be adjusted/varied/controlled based on one or both of the aforementioned control signals and sensor signals without having to manually adjust, for example, listening position of the user.

Figure 5:
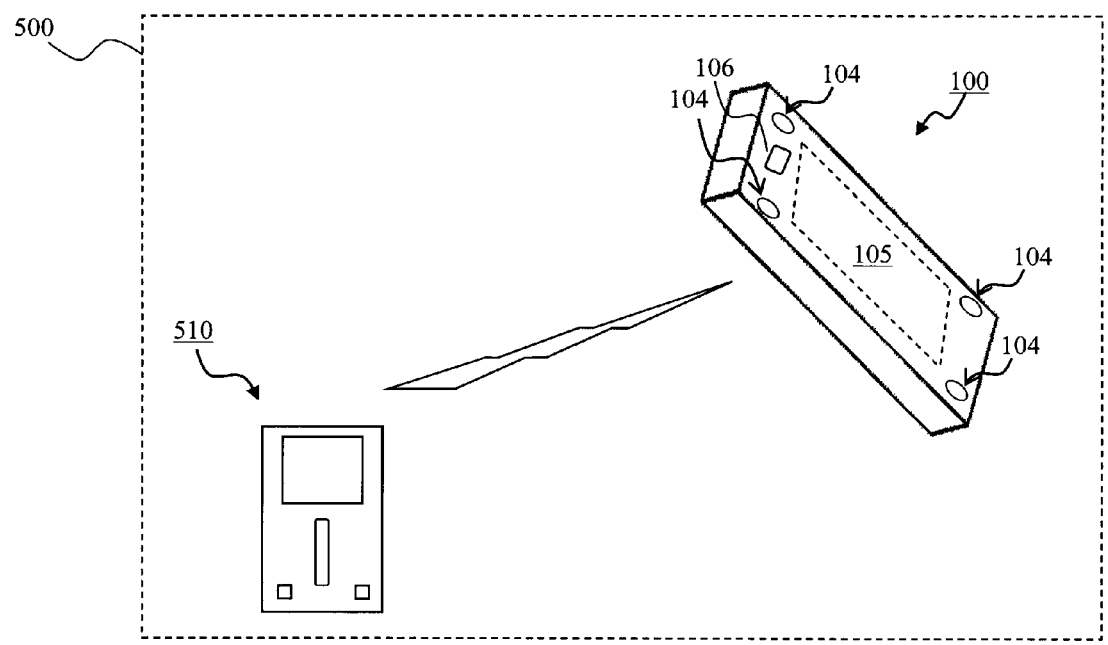
FIG. 5 shows an exemplary application of the electronic device, according to an embodiment of the disclosure.

Referring to FIG. 5, an exemplary application 500 of the electronic device 100 is shown. In the exemplary application 500, another electronic device such as a media player device 510 can be coupled to the electronic device 100. The media player device 510 can be coupled to the electronic device 100 via one or both of wired coupling and wireless coupling.

The media player device 510 can be configured to communicate audio signals to the electronic device 100. In this regard, audio signals communicated from the media player device 510 can correspond to audio input signals. The electronic device 100 can be configured to receive and process the audio input signals so as to produce audio output signals. The audio output signals can be communicated to and output at the audio output portions 104.

Therefore, in the exemplary application 500, audio signals (corresponding to audio input signals) communicated from the media player device 510 can be received at and processed by the electronic device 100 to produce audio output signals which can be communicated to, and output at, the audio output portions 104.

Additionally, the electronic device 100 can be configured to receive and process audio signals communicated from the media player device 510 in a manner analogous to the earlier discussion(s) with reference to FIG. 3 and FIG. 4.

Appreciably, the electronic device 100 can thus function as a portable speaker for another electronic device such as the aforementioned media player device 510.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

In one example, openings/perforations 202 can be arranged along the sides 102c of the casing 202 instead of at the second face 102b of the casing 102. Additionally, openings/perforations 202 can optionally be arranged along the sides 102c and/or the second face 102b of the casing 202.

In another example, output of the audio output signals can be varied/controlled in the context of time delay in the output of any of, or any combination of, the audio output portions 104. In an exemplary scenario, when the electronic device 100 is in the first orientation 400a, audio output signals can be output from each of the first to fourth speaker drivers 104a/104b/104c/104d at substantially the same time. When orientation of the electronic device 100 is changed from the first orientation 400a to the second orientation 400b, output of audio output signals from the third and fourth speaker drivers 104c/104d can be delayed by a predetermined amount of time with respect to the first and second speaker drivers 104a/104b. In this regard, the electronic device 100 can further include a delay module (not shown). The processing portion 300 can be coupled to the delay module. The delay module can be further coupled to the audio output portions 104. Based on one or both of control signals and sensor signals, the delay module can be configured to vary/control output of audio output signals in the context of time delay.

In yet another example, controlling/varying output of audio output signals and/or audio characteristics of audio input signals can be further based on sound/voice control. For example, the electronic device 100 can be configured to capture voice input of a user 410 using an audio detection unit (not shown) which can be coupled to the central processor unit 306. The audio detection unit can, for example, be a microphone. Captured voice input can be communicated as voice input signals to the central processor unit 306 for processing to produce control signals. The audio processor unit 310 can be configured to control/vary output of audio output signals and/or audio characteristics of audio input signals based on the control signals.

In yet a further example, the voice input signals can be communicated to the audio processor unit 310. Based on the voice input signals, the audio processor unit 310 can be configured to control/vary output of audio output signals and/or audio characteristics of audio input signals.

Furthermore, it can be appreciated that although the aforementioned first and second orientations 400a/400b are discussed in the context of changing orientation of the electronic device 100 between, for example, landscape orientation and portrait orientation, other situations such as tilting the electronic device 100 from an initial rest position can also be considered to be change in orientation.

For example, the electronic device 100 in an initial rest position (for example, laying flat on a table top) can be considered to be a first orientation 400a. A user 410 can tilt the electronic device 100 up from its initial rest position such that the electronic device 100 is in a tilted position. The tilted position can be considered to be a second orientation 400b. Therefore, by titling the electronic device 100 from its initial rest position, orientation of the electronic device 100 can be considered to have changed from the first orientation 400a (i.e., initial rest position) to the second orientation 400b (i.e., tilted position).

Moreover, although it is mentioned that the sensor unit 304 can be configured to sense/detect change in orientation of the electronic device 100 and communicate sensor signals indicative of change in orientation of the electronic device 100, it can be appreciated that the sensor unit 304 can also be configured to sense/detect movement of the electronic device 100 and communicate sensor signals indicative of movement of the electronic device 100. Movement of the electronic device 100 can, for example, be lateral based movement.

For example, the user 410 can move the electronic device 100 between at least a first location and a second location. Specifically, the user 410 can, for example, move the electronic device 100 from a first location to a second location. More specifically, the user 410 can, for example, move the electronic device 100 from his/her left (i.e., first location) to his/her right (i.e., second location). The sensor unit 304 can be configured to sense/detect movement of the electronic device 100 from the left to the right of the user 410 and communicate sensor signals indicative of the movement of the electronic device 100 (i.e., from the left to the right of the user 410).

The sensor signals can preferably be based upon to control/vary output of audio output signals from the audio output portions 104 and/or audio characteristics of the audio input signals. Alternatively the sensor signals can be processed to produce control signals. Control signals and/or sensor signals can be based upon to control/vary output of audio output signals and/or audio characteristics of the audio input signals.

The invention claimed is:

1. An electronic device comprising: a plurality of audio output portions corresponding to a plurality of speaker drivers configurable to output audio signals; and a casing shaped and dimensioned in a manner so as to form a plurality of protrusions, each protrusion capable of carrying at least a portion of a corresponding audio output portion, the casing comprising: a first face carrying a display module; a second face; and sides, the first and second faces being spaced apart in a manner such that the sides are defined between them, and the first and second faces being opposing faces of the casing, wherein the casing is further shaped and dimensioned in a manner so as to form a plurality of corners, and wherein a first protrusion of the plurality of protrusions extends along the entire thickness of the casing between the first face and the second face at a first corner and a second protrusion of the plurality of protrusions extends along the entire thickness of the casing between the first face and the second face at a second corner.

2. The electronic device as in claim 1, wherein the number of protrusions corresponds to the number of audio output portions.

3. The electronic device as in claim 1 wherein output of audio output signals is one of controlled and varied in the context of directivity of output of audio output signals via the plurality of audio output portions.

4. The electronic device as in claim 1 wherein output of audio output signals is one of controlled and varied in the context of at least one of:
impeding output of at least one of the plurality of frequency ranges via at least a portion of the audio output portions; and
allowing output of only at least one of the plurality of frequency ranges via at least a portion of the audio output portions.

5. The electronic device as in claim 1, wherein the first corner and the second corner are either laterally or diagonally positioned to each other on the casing.

6. The electronic device as in claim 1, wherein the first protrusion and second protrusion of the plurality of protrusions are shaped and dimensioned in a manner so as to prevent direct contact between the display module and a surface on which the electronic device is placed when the electronic device is placed with the first face facing the surface.

7. The electronic device as in claim 1, wherein the casing is further shaped and dimensioned in a manner so as to form a plurality of openings for pressure equalization.

8. The electronic device as in claim 1, wherein the casing is further shaped and dimensioned in a manner so as to include one or more enclosures associated with the plurality of audio output portions.

9. The electronic device as in claim 1, wherein the electronic device further comprises an image capture module and/or a photonic based detector/sensor.

10. The electronic device as in claim 9, wherein the casing is further shaped and dimensioned to carry the image capture module and/or the photonic based detector/sensor.

* * * * *